United States Patent [19]

Ishida et al.

[11] Patent Number: 5,524,079

[45] Date of Patent: Jun. 4, 1996

[54] REAR WHEEL STEERING ANGLE CONTROLLING APPARATUS OF FOUR-WHEEL STEERING VEHICLE

[75] Inventors: Akira Ishida, Sakai; Takashi Fukunaga, Hirakata; Akiyoshi Segawa, Osaka, all of Japan

[73] Assignee: Matsushita Electric Industrial Co., Ltd., Osaka-fu, Japan

[21] Appl. No.: 112,658

[22] Filed: Aug. 27, 1993

[30] Foreign Application Priority Data

| Sep. 1, 1992 | [JP] | Japan | 4-233372 |
| Dec. 21, 1992 | [JP] | Japan | 4-340004 |
| Mar. 12, 1993 | [JP] | Japan | 5-051908 |

[51] Int. Cl.$^6$ .................................................. B62D 5/04
[52] U.S. Cl. .................. 364/424.05; 180/412; 180/445
[58] Field of Search ................... 364/424.01, 424.05; 180/79.1, 140, 142; 280/91

[56] References Cited

U.S. PATENT DOCUMENTS

| 4,703,822 | 11/1987 | Kawamoto et al. | 180/140 |
| 4,718,685 | 1/1988 | Kawabe et al. | 280/91 |
| 4,842,089 | 6/1989 | Kimbrough et al. | 180/79.1 |
| 4,947,326 | 8/1990 | Mori et al. | 364/424.05 |
| 5,019,982 | 5/1991 | Furukawa | 364/424.05 |
| 5,020,619 | 6/1991 | Kanazawa et al. | 364/424.05 |
| 5,249,638 | 10/1993 | Watanabe et al. | 180/79.1 |
| 5,251,135 | 10/1993 | Serizawa et al. | 364/424.05 |
| 5,261,503 | 11/1993 | Yasui | 180/142 |
| 5,267,160 | 12/1993 | Ito et al. | 364/424.05 |
| 5,274,555 | 12/1993 | Fukunaga et al. | 364/424.05 |

FOREIGN PATENT DOCUMENTS 0430028  6/1991  European Pat. Off. .

OTHER PUBLICATIONS

Proceedings of the 1988 American Control Conference; vol. 2, 1988, Atlanta, U.S.; pp 904–911; Kamal Youcef–Toumi; Osamu Ito, 'A Time Delay Controller for Systems with Unknown Dynamics'.

Primary Examiner—Kevin J. Teska
Assistant Examiner—Tyrone V. Walker
Attorney, Agent, or Firm—Wenderoth, Lind & Ponack

[57] ABSTRACT

A control system robust with respect to a vehicle dynamic characteristic variation by a vehicle speed change by estimating an unknown characteristic term in a target yaw rate following system so as to reduce a side slip angle at a transmission time, wherein right and left rear wheels are directly steered using an electric motor controller, and an instruction signal to the motor controller is calculated with a simple calculation using a vehicle speed characteristic estimator with a control amount calculator so that a real yaw rate may follow a target yaw rate calculated by a target yaw rate calculator using respective sensor output values of a vehicle speed sensor, a yaw rate sensor, a steering wheel angle sensor, and a rear wheel steering sensor for each control period.

32 Claims, 19 Drawing Sheets

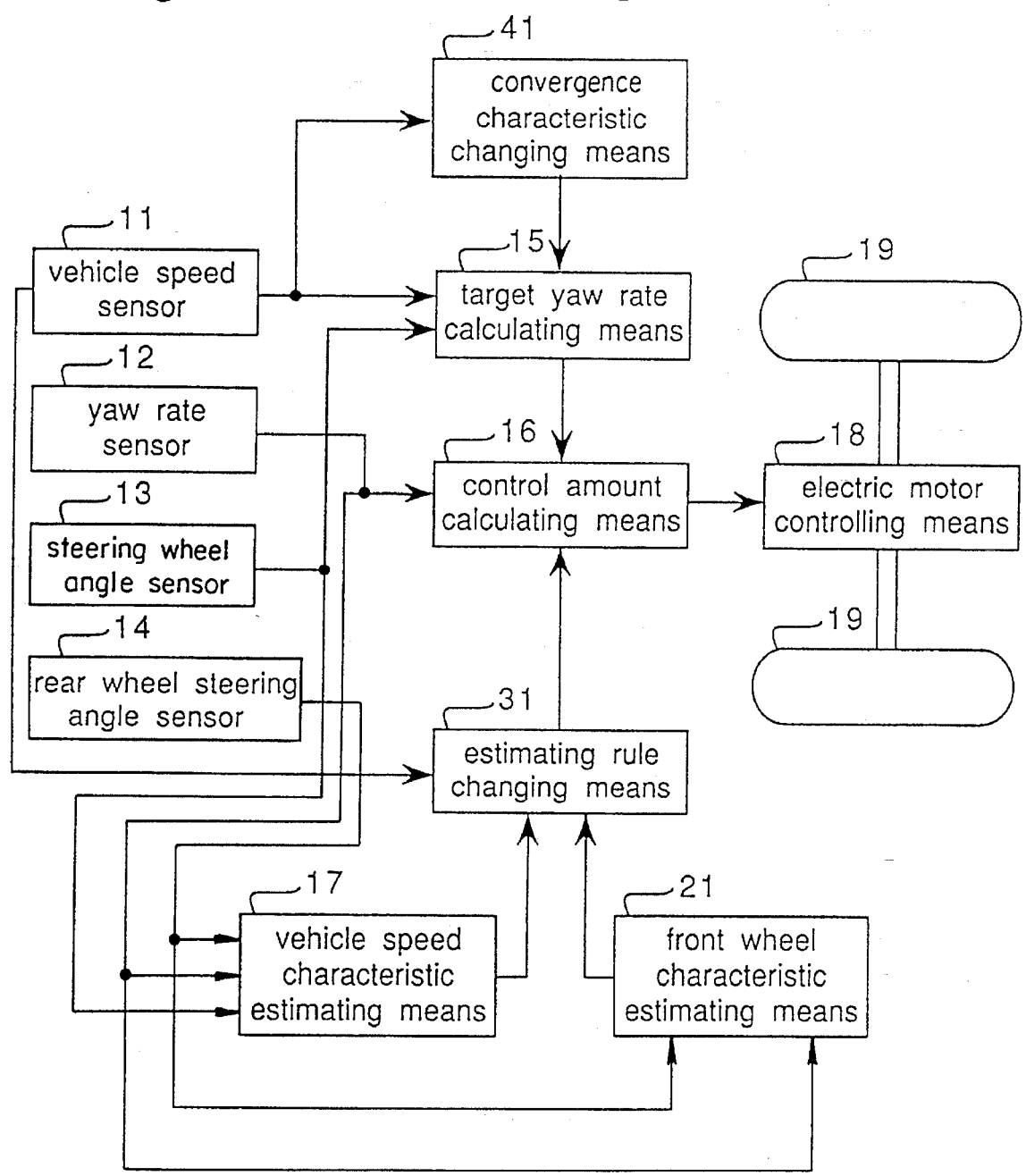

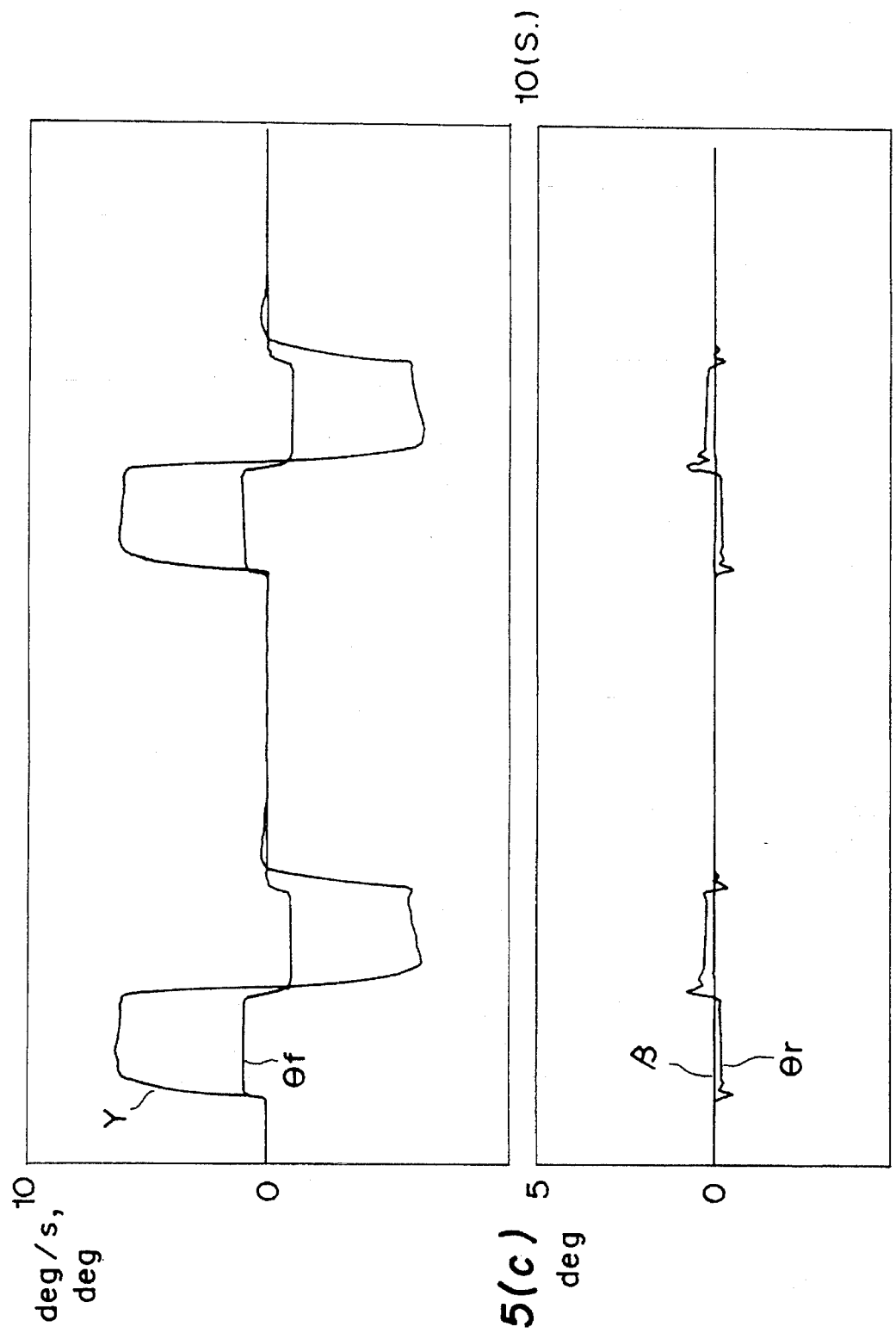

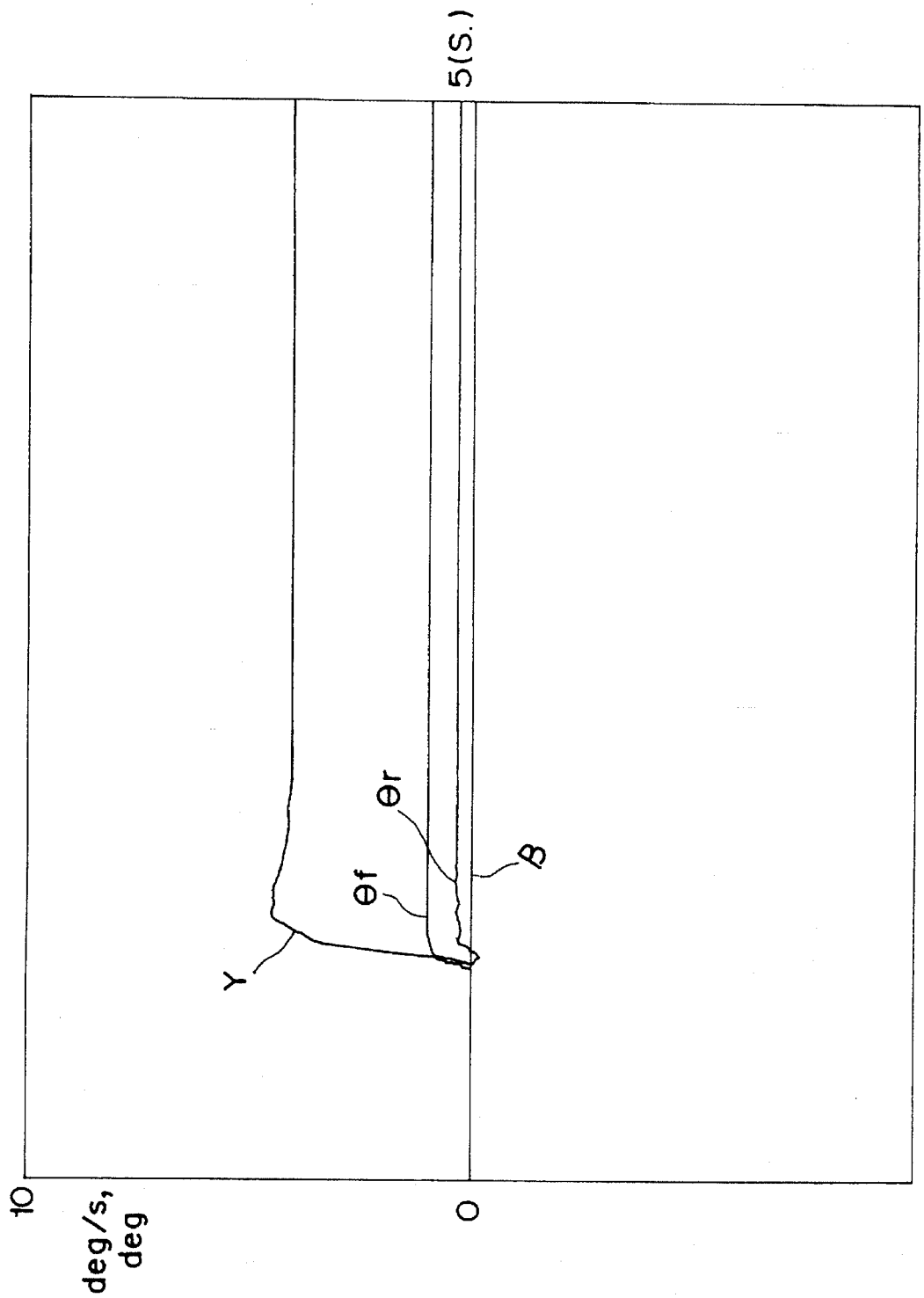

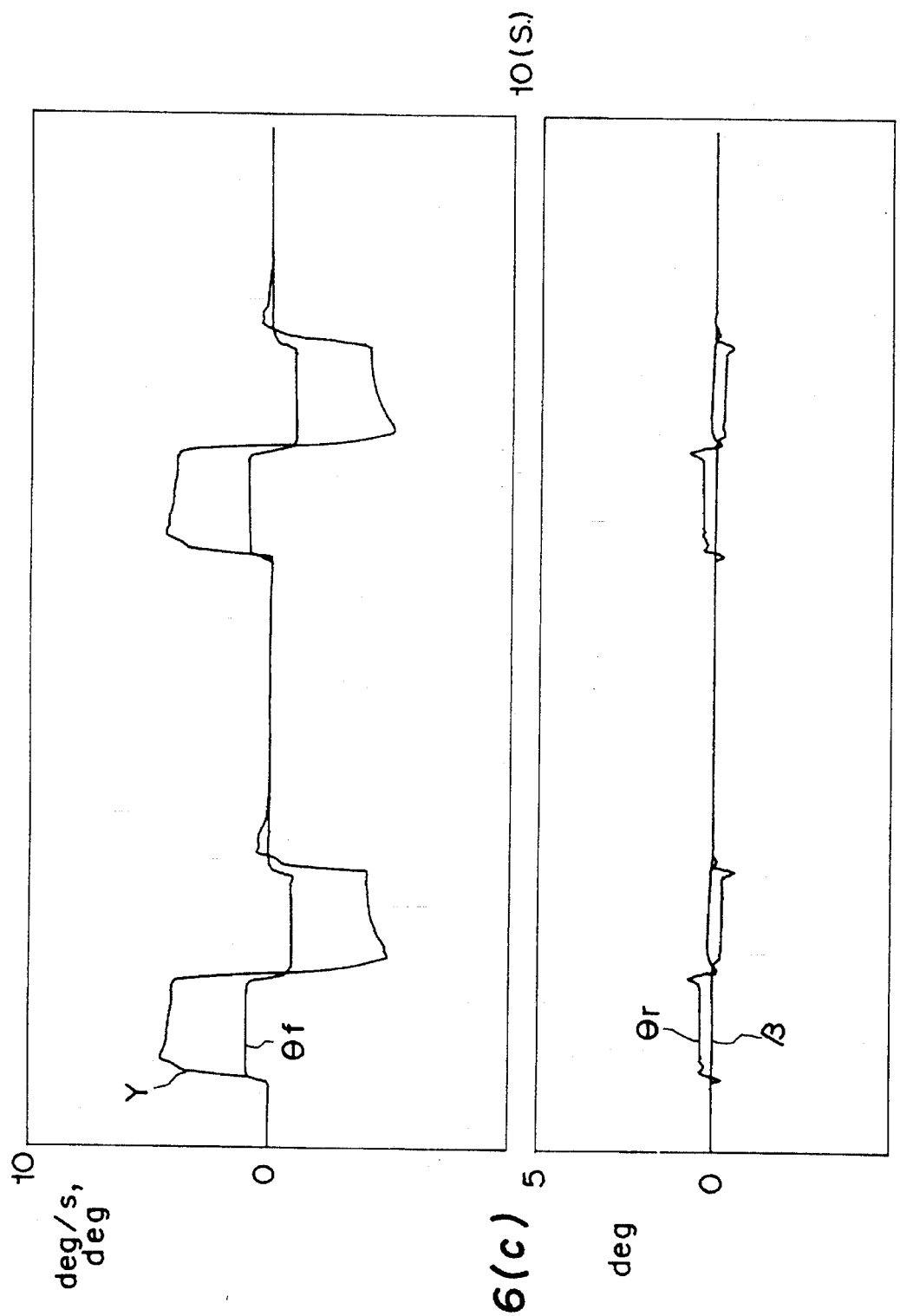

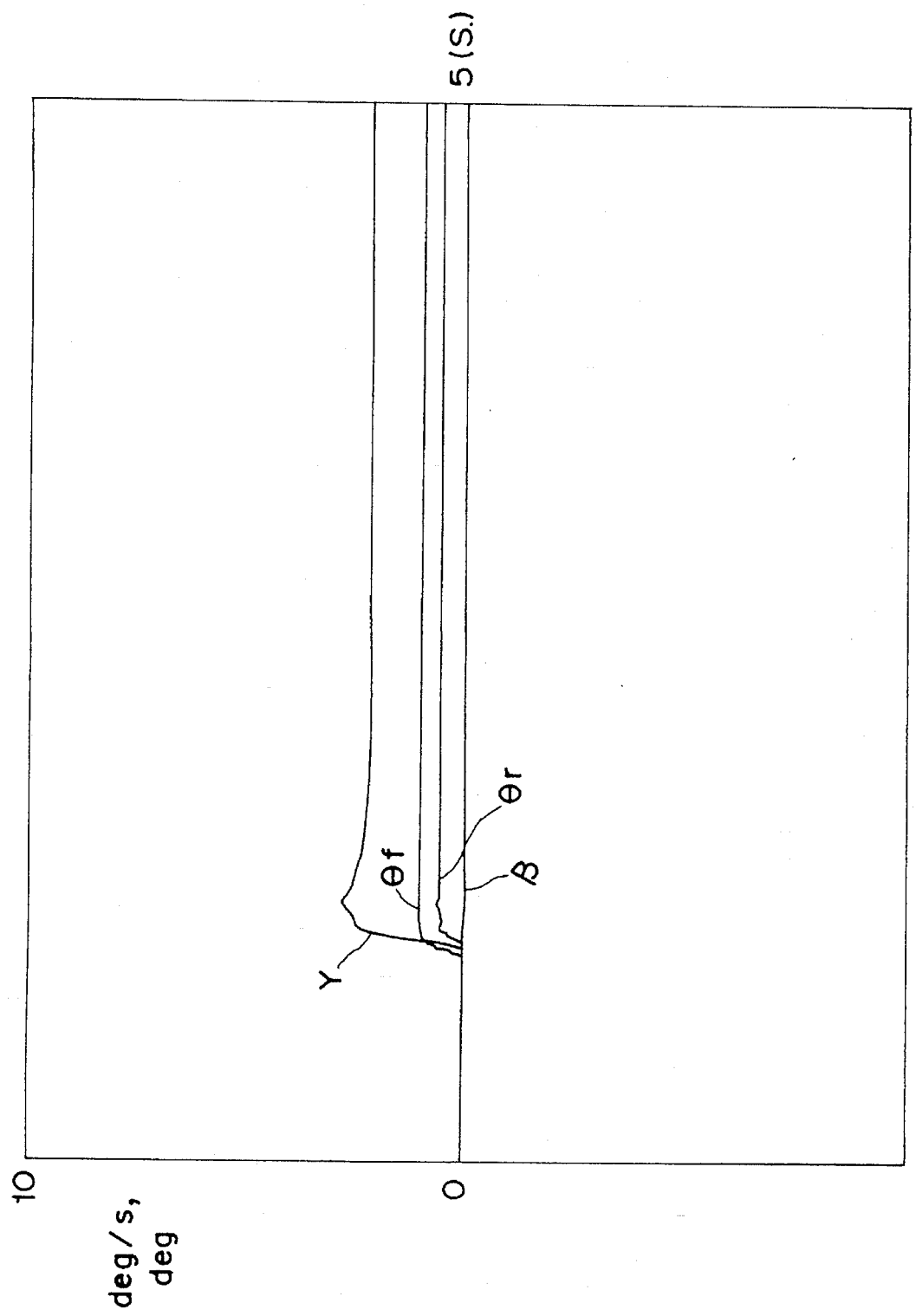

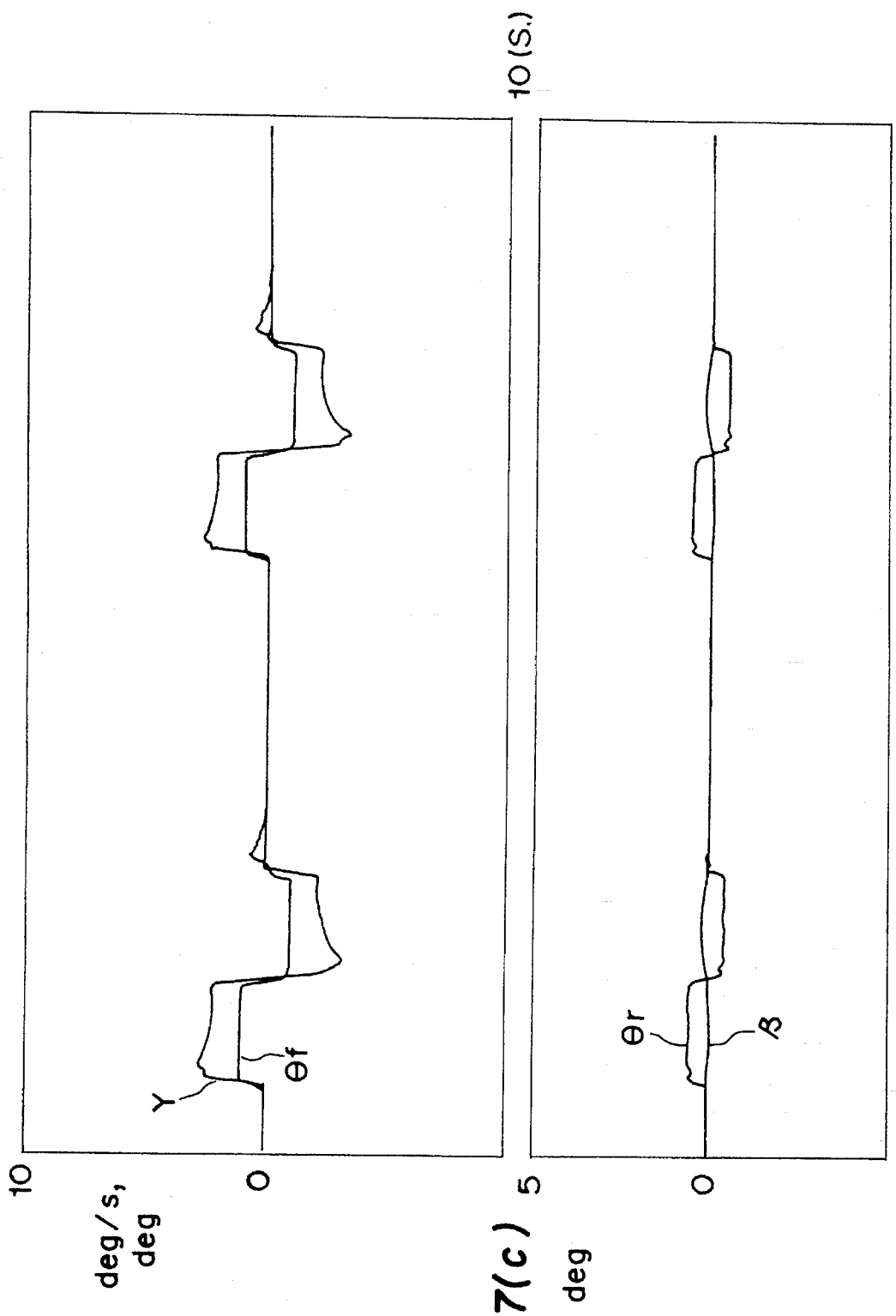

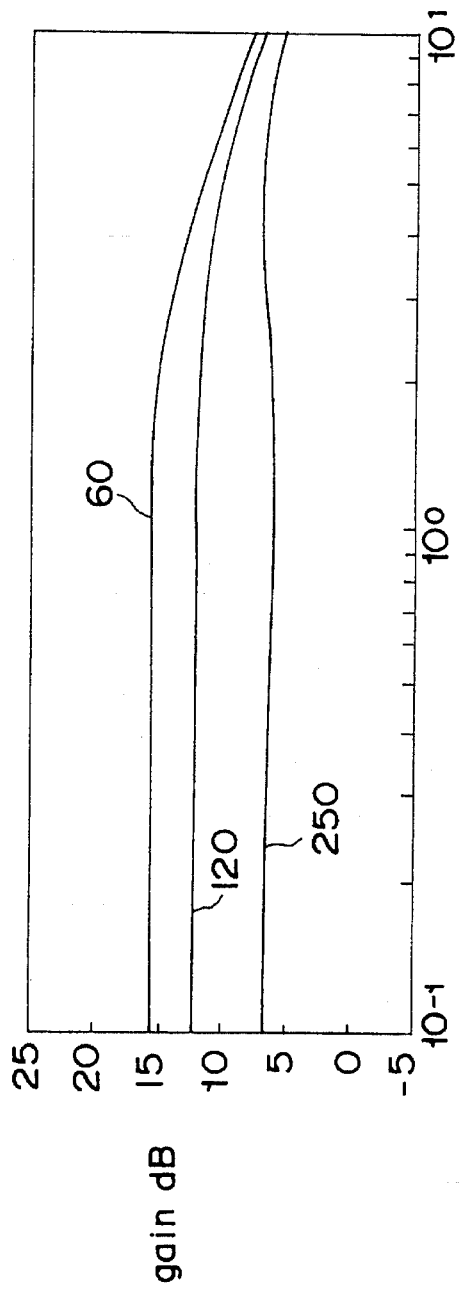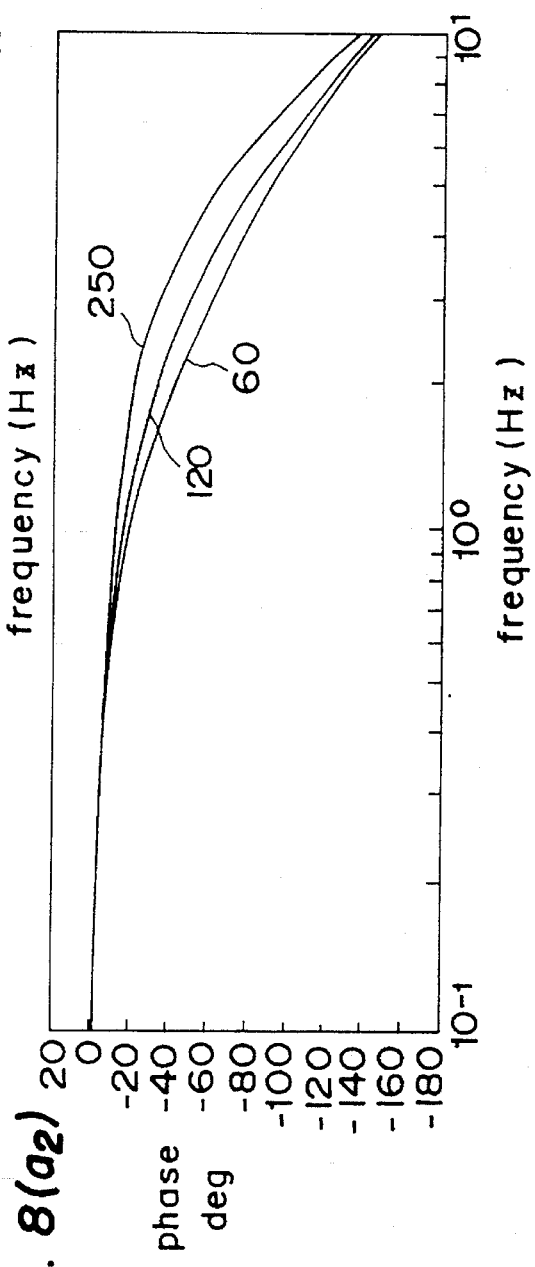

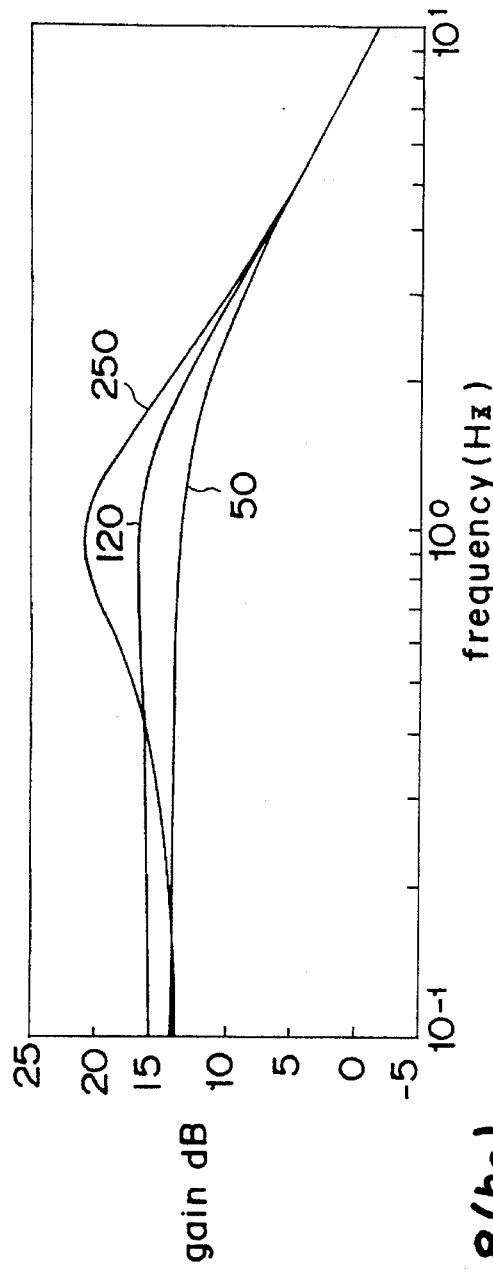
Fig. 8(b₁)
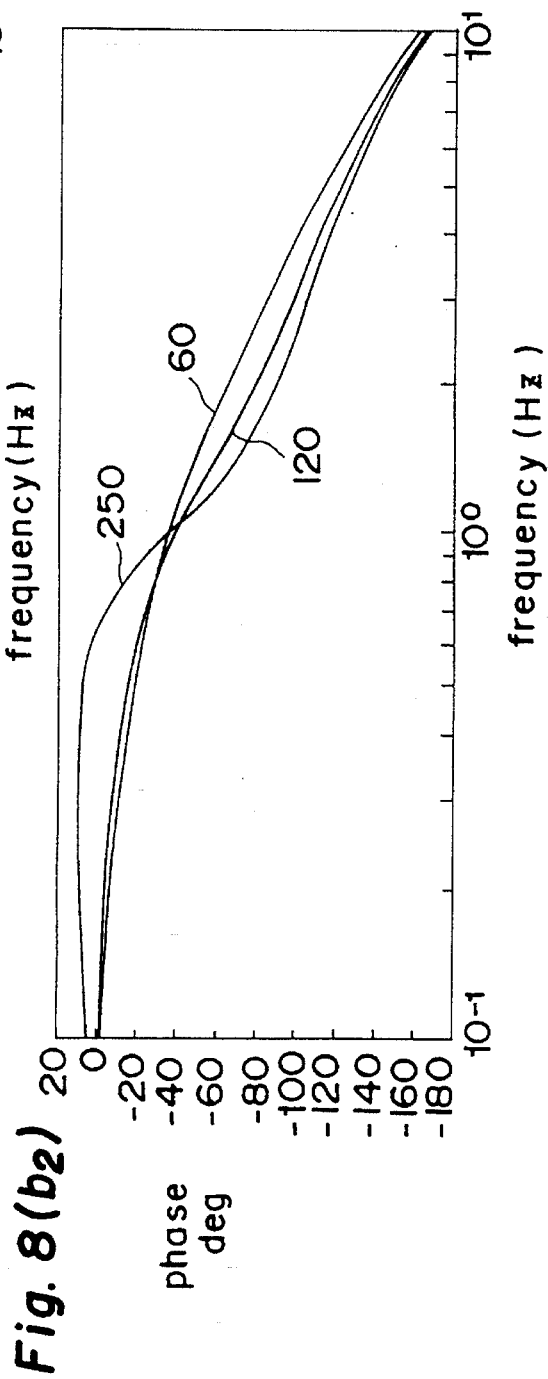
Fig. 8(b₂)

REAR WHEEL STEERING ANGLE CONTROLLING APPARATUS OF FOUR-WHEEL STEERING VEHICLE

BACKGROUND OF THE INVENTION

The present invention relates to an apparatus for controlling the steering angle of a rear wheel of a four-wheel steering vehicle in which the rear wheel is steered in accordance with a steering wheel steering angle, a vehicle speed, and a vehicle yaw rate in a vehicle such as an automobile or the like.

Various four-wheel steering apparatuses for improving steering stability during the operation of a vehicle have been proposed. As disclosed in, for example, Japanese Laid-Open Patent Publication No. 3-164374, an actual yaw rate (rotary angular velocity around the gravity center of a vehicle body as seen from above the vehicle body) is detected by a yaw rate sensor in a steering wheel steering angle by a steering wheel steering angle sensor, and a steering speed of a front wheel is added in the form of a multiplication of the steering speed of the front wheel by a steering control amount in a yaw rate restraining direction. A steering control amount in a yaw rate restraining direction is changed in accordance with a steering speed so that the steering control amount in a yaw rate restraining direction of a steering wheel during a stationary circle turning operation can be made small and an initial rotation during an abrupt steering time of a front wheel may be improved.

In Japanese Laid-Open Patent Publication No. 60-124572, there is proposed a yaw rate following controlling system for calculating a target yaw rate from the steering wheel angle and the vehicle speed, and for steering a rear wheel so that the actual yaw rate may follow the target yaw rate. If a route and a direction of a vehicle go wrong because of external disturbance causes such as a crosswind, a bad road state and so on, due to the yaw rate feedback, any one of the systems has an advantage in that it is capable of steering correction by the rear wheel steering operation.

The conventional four-wheel steering apparatus constructed as described hereinabove takes more time to decide control gains for the calculation of the rear wheel target steering angle so that the side slip angle may be made smaller for safety because of steering wheel angles, yaw rates, and vehicle speeds, which causes a problem in that a control system which is robust, and superior in response with respect to the vehicle speed is hard to design so as to have a simple construction.

The yaw rate sensor is adapted to remove noise through a filter for use in the inputs during the control amount calculation when signals are likely to be influenced by noise so that better precision cannot be directly obtained in the first order differential value, the second order differential value and so on. In order to remove noise of differential values of the yaw rate enough so as to not influence the rear wheel, a cut off frequency of the filter has to be lowered, which causes a defect in that the phase delay of the entire yaw rate feedback loop becomes larger, thus deteriorating control performance. Although a differential value is obtained by a difference equation when a sensor which directly obtains a second order differential value does not exist, the reliability of higher order differential values is lowered considerably.

A stationary target yaw rate also becomes equal to zero when the vehicle speed becomes zero in a target yaw rate following system, which causes a defect in that a smaller turning property during a starting operation cannot be obtained.

A road surface friction coefficient $\mu$ changes by approximately five times between a dry road surface and a wet road surface, thus changing the transfer characteristics of a vehicle body. When a target yaw rate for the dry road surface is used on a wet road surface, the target yaw rate becomes excessive, thus causing a spinning possibility. When a target yaw rate set on the wet road surface is used on a dry road surface, the yaw rate becomes too small to obtain a satisfactory response.

The same thing can be said even about a control gain C. When a control gain C for a dry road surface is used on a wet road surface, the following of the target yaw rate becomes deteriorated. On the other hand, when an optimum control gain C used on a dry road surface is used on a wet road surface, there is a defect in that safety is deteriorated.

When a steering wheel steering angle is large, the restraining region of a tire goes outside especially on a low $\mu$ road into a non-linear region so as to lower the steering safety. It is necessary to lower a target yaw rate before the capability of the tire is exceeded.

SUMMARY OF THE INVENTION

Accordingly, the present invention has been developed with a view to substantially eliminating the above discussed drawbacks inherent in the prior art and has for its essential object to provide an improved rear wheel steering angle controlling apparatus of a four-wheel steering vehicle.

Another important object of the present invention is to provide an improved rear wheel steering angle controlling apparatus of a four-wheel steering vehicle capable of obtaining a superior steering safety of a vehicle where a vehicle body side slip angle is small even at a robust and transient time with respect to an unknown variation term.

In accomplishing these and other objects, according to preferred embodiments of the present invention, there is provided a four-wheel steering controlling apparatus for steering a vehicle, which is provided with a vehicle speed sensor for detecting the speed of a vehicle, a yaw sensor for detecting a yaw rate, a steering wheel angle sensor for detecting the rotary angle of a steering wheel, a rear wheel steering angle sensor for detecting a rear wheel steering angle, and an electric motor controlling means for steering a rear wheel in accordance with a rear wheel steering angle instruction signal, and includes: a target yaw rate calculating means for calculating a target yaw rate in accordance with a vehicle speed, a steering wheel angle, and an actual yaw rate detected from the yaw rate sensor; a control amount calculating means for calculating a rear wheel steering angle instruction signal value which is fed to the electric motor controlling means using respective values of the vehicle speed, the yaw rate, the steering wheel angle, and the rear wheel steering angle detected by the sensor so that error with respect to the target yaw rate is reduced, and which is characterized in that a vehicle speed characteristic estimating means estimates the variation term, with only a vehicle speed change of a vehicle or a vehicle speed change of a vehicle, and a term of an unknown portion of a dynamic variation by a steering wheel operation by the front wheel characteristic estimating means provided as a certain control period, so as to calculate a rear wheel steering angle instruction signal value where the actual yaw rate becomes a target yaw rate response. The vehicle speed characteristic estimating means and the front wheel characteristic estimating means are switched in accordance with a vehicle speed by an estimating rule changing means. The target yaw rate is characterized in having a zero point stable in a transfer function of an error dynamic for determination of characteristics for spreading to a stationary yaw rate value corresponding to the steering wheel angle, and the vehicle speed. Each coefficient for determining the behavior of the error dynamics is adapted to be given in a function of the vehicle speed.

The present invention does not require a correct vehicle model in the determination of the control gain by the estimation of unknown terms by model errors of a vehicle and variation in vehicle dynamics characteristics with known terms before microtime or minute period by the above described construction. A robust control system can be obtained by a simple construction with respect to the variations in a system by the vehicle speed and the steering wheel operation. The target raw rate has a zero point stable in the transfer function of the error dynamics for deciding the spreading characteristics in a stationary rate value corresponding to the steering wheel angle, and the vehicle speed so that a yaw rate generating effect can be increased at the front wheel steering time, and the side slip angle at a transient time can be reduced by steering the rear wheel in a reverse phase for a moment. The respective coefficients for deciding the behaviors of the error dynamics are functions of the vehicle speed so that the side slip angle at the transition time in the respective vehicle speed regions can be reduced.

BRIEF DESCRIPTION OF THE DRAWINGS

These and other objects and features of the present invention will become apparent from the following description of the preferred embodiments thereof with reference to the accompanying drawings, in which:

FIG. 4 is a view showing an apparatus for controlling a rear wheel steering angle of a four-wheel steering vehicle in accordance with a fifth embodiment of the present invention;

FIGS. 5(a)–5(c) are graphs indicating simulation results of a 60 km/h vehicle speed in an embodiment of the present invention;

FIGS. 6(a)–6(c) are graphs indicating simulation results of a 120 km/h vehicle speed in an embodiment of the present invention;

FIGS. 7(a)–7(c) are graphs indicating simulation results of a 250 km/h vehicle speed in an embodiment of the present invention;

FIGS. 8($a_1$), 8($a_2$), 8($b_1$) and 8($b_2$) are graphs indicating the relationship in a frequency response in different vehicle speed regions between a loaded vehicle in an embodiment of the present invention and a conventional vehicle;

DETAILED DESCRIPTION OF EMBODIMENTS OF THE INVENTION

Figure 1:
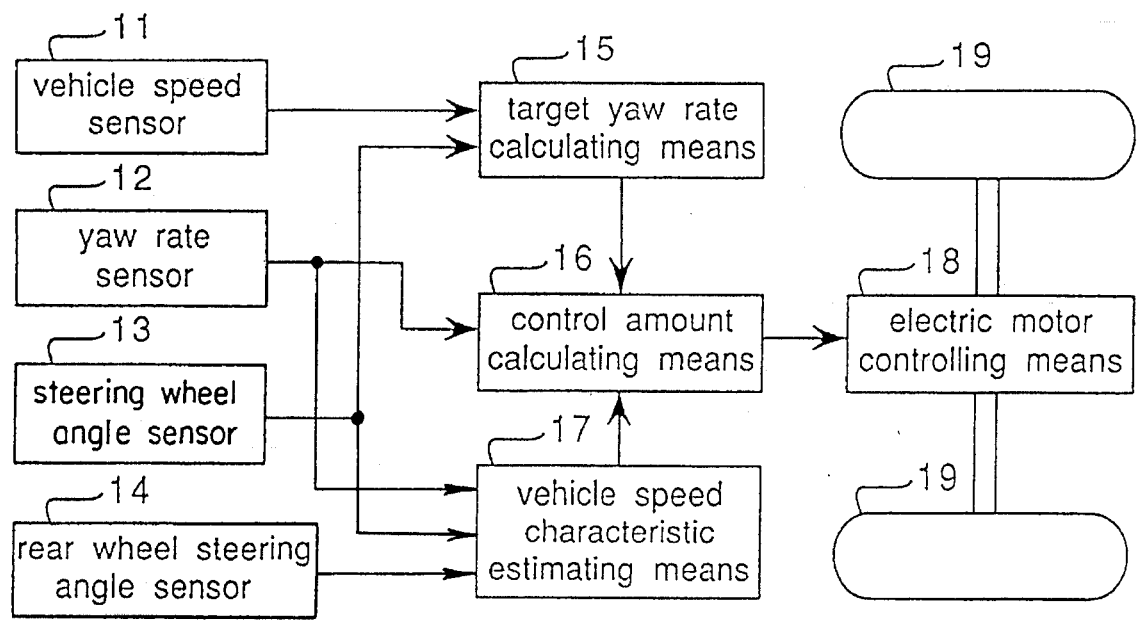
FIG. 1 is a view showing an apparatus for controlling a rear wheel steering angle of a four-wheel steering vehicle in accordance with a first embodiment of the present invention.

Before the description of the present invention proceeds, it is to be noted that like parts are designated by like reference numerals throughout the accompanying drawings.

An apparatus for controlling a rear wheel steering angle of a four-wheel steering vehicle in accordance with a first embodiment of the present invention is described as follows with reference to FIG. 1. Right and left rear wheels 19 are directly steered an electric motor controlling means 18. An instruction signal to the electric motor controlling means 18 is calculated with a simple calculation by a control amount calculating means 16 using a vehicle speed characteristic estimating means 17 so that an actual yaw rate may follow a target yaw rate calculated by a target yaw rate calculating means 15 using the respective sensor output values of a vehicle speed sensor 11, a yaw rate sensor 12, a steering wheel angle sensor 13, and a rear wheel steering angle sensor 14.

The algorithm used in the first embodiment is described hereinafter. A vehicle model of two degree freedom system will be represented with a following equation.

$$\begin{vmatrix} \dot{Y} \\ \dot{\beta} \end{vmatrix} = \begin{vmatrix} -a11 & -a12 \\ -a21 & -a22 \end{vmatrix} \begin{vmatrix} Y \\ \beta \end{vmatrix} + \begin{vmatrix} b1r \\ b2r \end{vmatrix} \theta r + \begin{vmatrix} b1f \\ b2f \end{vmatrix} \theta f \quad (1)$$

$a11 = 2(lf^2 kf + lr^2 kr)/IV$
$a12 = 2(lfkf - lrkr)/I$
$a21 = 1 + 2(lfkf - lrkr)/mV^2$
$a22 = 2(kf + kr)/mV$ $b1r = -2lrkr/I$
$b2r = 2kr/mV$
$b1f = 2lfkf/I$
$b2f = 2kf/mV$ where Y: yaw rate, β: side slip angle, θr: rear wheel steering angle, θf: front wheel steering angle, lr: distance to rear axle from the center of gravity (CG), lf: distance to front axle from the center of gravity, kr: cornering stiffness at rear wheels, kf: cornering stiffness at front wheels, I: yaw moment of inertia, m: vehicle mass, V: vehicle speed.

Subjecting equation (1) to a Laplace transformation with a Laplace operator S, and rearranging it in connection with Y, $$Y(s) = Gr(s)\theta r(s) + Gf(s)\theta f(s) \quad (2)$$

$$Gr(s) = [b1rS + a22b1r - a12b2r]/[S^2 + (a11 + a22)S + a11a22 - a12a21]$$

$$= (cS - d)/(S^2 + aS + b)$$

-continued $$Gf(s) = [b1fS + a22b1f - a12b2f]/[S^2 + (a11 + a22)S + a11a22 - a12a21]$$
$$= (eS + d)/(S^2 + aS + b)$$

$c = b1r, e = b1f,$
$d = -a22b1r + a12b2r = a22b1f - a12b2f = 4kfkr(1f + 1r)/lmV$
$a = a11 + a22, b = a11a22 - a12a21$ By expanding the above equation, the following differential equation showing a property until an actual yaw rate in the vehicle is generated by the operation of rear wheels and front wheels is obtained.

$$\ddot{Y}(t) + a(V)\dot{Y}(t) + b(V)Y(t) = c\dot{\theta}r(t) - d(V)\theta r(t) + e\dot{\theta}f(t) + d(V)\theta f(t) \quad (3)$$

In the above equation, which is a vehicle model subjected to be controlled, coefficients a, b, d are functions of a vehicle speed V. As the θf is an unexpected input, it may be considered an external disturbance to a system. The reference model of the yaw rate which is employed at the time of calculating a target yaw rate by the target yaw rate calculating means 15 of a target yaw rate is given by the following equation.

$$\ddot{Y}m(t) + am\dot{Y}m(t) + bmYm(t) = Y_0\phi bmR(t)(Y_0bm = dm, R(t) = \theta f(t)) \quad (4)$$

R(t) is a steering angle of front wheel calculated by the steering wheel angle detected by the steering wheel angle sensor 13, and Yφ is a stationary yaw rate gain determined when β(S)/θf(S)=O (β: side slip angle) is established with a two-wheel model, and is expressed by the following equation by a vehicle speed V detected by the vehicle speed sensor 11.

$$Y_0 = (b1f - b2f*b1r/b2r)/(-a11 + a21*b1r/b2r) \quad (5)$$
$$= 2kf(1f + 1r)V/(2kf1f(1f + 1r) + 1rmV^2)$$

A target yaw rate follow rule is determined using Time Delay Control (hereinafter referred to as a TDC) which is one type of adaptive control. These are described fully in YoucefToumi, K. and Ito, O., "A Time Delay Controller for Systems with Unknown Dynamics", Trans ASME, Journal of Dynamic Systems, Measurement and Control, Vol. 112, No. 1, pp. 132 through 142, Mar., 1990.

In a first embodiment of the present invention, a term which a coefficient that is a function of the vehicle speed V of the equation (3) is related to is approximated as an unknown term by a known term before microtime L by a vehicle speed characteristic estimating means 17.

$$a(V)\dot{Y}(t) + b(V)Y(t) + d(V)[\theta r(t) - \theta f(t)] \text{ unknown term} \approx \quad (6)$$
$$-\ddot{Y}(t - L) + c\dot{\theta}r(t - L) + e\dot{\theta}f(t - L) \text{ known term}$$

The following equation is obtained by the equations (3), (4) in e(t)=Ym(t)−Y(t), wherein e(t) is an error caused between an actual yaw rate detected by the yaw rate sensor 12 and the target yaw rate calculated by the target yaw rate operation means 15.

$$\ddot{e}(t) = \ddot{Y}m(t) - \ddot{Y}(t) \quad (7)$$
$$= -am\dot{Y}m(t) - bmYm(t) + dmR(t) + \underline{a(V)\dot{Y}(t) +}$$
$$\underline{b(V)Y(t) + d(V)[\theta r(t) - \theta f(t)]} - c\dot{\theta}r(t) - e\dot{\theta}f(t)$$

Substituting the equation (6) into a underlined portion of the above equation and rearranging it, the following is obtained.

$$\ddot{e}(t) + am\dot{e}(t) + bme(t) = -\ddot{Y}(t - L) - am\dot{Y}(t) - \quad (8)$$
$$bmY(t) + dmR(t) -$$
$$c[\dot{\theta}r(t) - \dot{\theta}r(t - L)] - e[\dot{\theta}f(t) - \dot{\theta}f(t - L)]$$

Put right side = $Ke(t)$ \quad (9)

$$\ddot{e}(t) + am\dot{e}(t) + bme(t) = ke(t)$$

Select k optionally and spreading performance desired into a target yaw rate can be obtained. As k=0, a rear wheel steering angle θr(t) which is a control input is obtained from the equation (8).

A differential value is calculated by the following difference equation as a sampling period L.

The following equation employed by the control amount calculating means 16 is determined from the equation (8) by $$\dot{\theta}r(t) = [\theta r(t) - \theta r(t - L)]/L \quad (10)$$

$$\theta r(t) = 2\theta r(t - L) - \theta r(t - 2L) - \quad (11)$$
$$(e/c)[\theta f(t) - 2\theta f(t - L) + \theta f(t - 2L)] + (Ldm/c)R(t) -$$
$$(1/Lc)[Y(t) - 2Y(t - L) + Y(t - 2L)] - (am/c)[Y(t) -$$
$$Y(t - L)] - (Lbm/c)Y(t)$$

From $R(t) = \theta f(t)$ $$\theta r(t) = 2\theta r(t - L) - \theta r(t - 2L) + (Ldm/c - e/c)\theta f(t) + \quad (12)$$
$$(2e/c)\theta f(t - L) - (e/c)\theta f(t - 2L) - (1/Lc + am/c +$$
$$Lbm/c)Y(t) + (2/Lc + am/c)Y(t - L) - (1/Lc)Y(t - 2L)$$

The front wheel steering angle θf is given by the following equation by a steering wheel steering angle θH.

$$\theta f(t) = \theta H(t)/Ns$$

Ns: steering gear ratio

The above equation is a control input to the motor control means 18 when a term where a vehicle dynamic characteristics are varied by the vehicle speed by the vehicle speed characteristic estimating means 17, i.e., the first embodiment of the present invention operates using equation (6). Superior control results are superior even with respect to the vehicle speed variation and following an actual yaw rate to a target yaw rate which is given by a target yaw rate calculating means 15, i.e., the equations (4) and (5) are obtained by a control amount calculating means 16 without preservation, as a map, in a large quantity of gain corresponding to the vehicle speed using equation (12). Stable characteristics are shown especially in a high speed region.

The present embodiment is as follows when the error dynamics before microtime L is taken into consideration.

The error dynamics before microtime L is given in a following equation from the equation (7).

$$\ddot{e}(t - L) = -am\dot{Y}(t - L) - bmYm(t - L) + \quad (13)$$
$$dmR(t - L) + pm1R(t - L) \underline{+ a(V)\dot{Y}(t - L) +}$$
$$\underline{b(V)Y(t - L) + d(V)[\theta r(t - L) - \theta f(t - L)]} -$$
$$c\dot{\theta}r(t - L) - e\dot{\theta}f(t - L)$$

Substituting the equations (3) and (6) before microtime L into the underlined portion of the above equation and subtracting the difference of the equations (7) and (8) for the rearrangement thereof, the following is formed.

$$\Delta\ddot{e}(t) + am\Delta\dot{e}(t) + bm\Delta e(t) = \quad (14)$$
$$-am\Delta\dot{Y}(t) - bm\Delta Y(t) + dm\Delta R(t) +$$

-continued $$pm1\Delta\ddot{R}(t) - c\Delta\dot{\theta}r(t) - e\Delta\dot{\theta}f(t)$$

in right side $= k1\Delta e(t) + k2\Delta\dot{e}(t)$ (15)

$$\Delta\ddot{e}(t) + am\Delta\dot{e}(t) + bm\Delta e(t) = k1\Delta e(t) + k2\Delta\dot{e}(t)$$

Select k1 and k2 optionally, and the spreading performance to be desired as $\Delta e(t) \to 0$ can be obtained. A rear wheel steering angle $\theta r(t)$ which is a control input that becomes $e(t) \to 0$ is obtained as k1 and k2=0.

A control rule which becomes $\Delta e(t) \to 0$ is represented by the following equation.

$$c\Delta\dot{\theta}r(t) = -e\Delta\dot{\theta}f(t) - am\Delta\dot{Y}(t) - bm\Delta Y(t) + dm\Delta R(t) + pm1\Delta\ddot{R}(t) \quad (16)$$

A control rule which becomes $e(t) \to 0$ is expressed by the following equation.

$$c\dot{\theta}r(t) = -\dot{\theta}f(t) - am\dot{Y}(t) - bmY(t) + dmR(t) + pm1\ddot{R}(t) \quad (17)$$

A differential value is calculated by the following difference equation with a sampling period being provided as L.

$$\dot{\theta}r(t)[\theta r(t) - \theta r(t-L)]/L \quad (18)$$

The following equation is obtained from equation (12). From $R(t) = \theta f(t)$, the following is obtained.

$$\theta r(t) = \theta r(t-L) - (e/c)[\theta f(t) - \theta f(t-L)] + \quad (19)$$

$$(Ldm/c)\theta f(t) + (pm1/c)[\dot{\theta}f(t) - \dot{\theta}f(t-L)] -$$

$$(am/c)[Y(t) - Y(t-L)] - (Lbm/c)Y(t)$$

The front wheel steering angle $\theta f$ is given by the following equation from a handle steering angle $\theta H$.

$$\theta f(t) = \theta H(t)/Ns$$

Ns: steering gear ratio

The above equation is a control input when a two-order differential value of a yaw rate is not used from the first embodiment of the invention. A control which can follow the target yaw rate with better precision can be realized without the use of the yaw rate two-story differential value which is low in reliability can be realized using equation (19).

The algorithm used in the second embodiment is described hereinafter.

Figure 2:
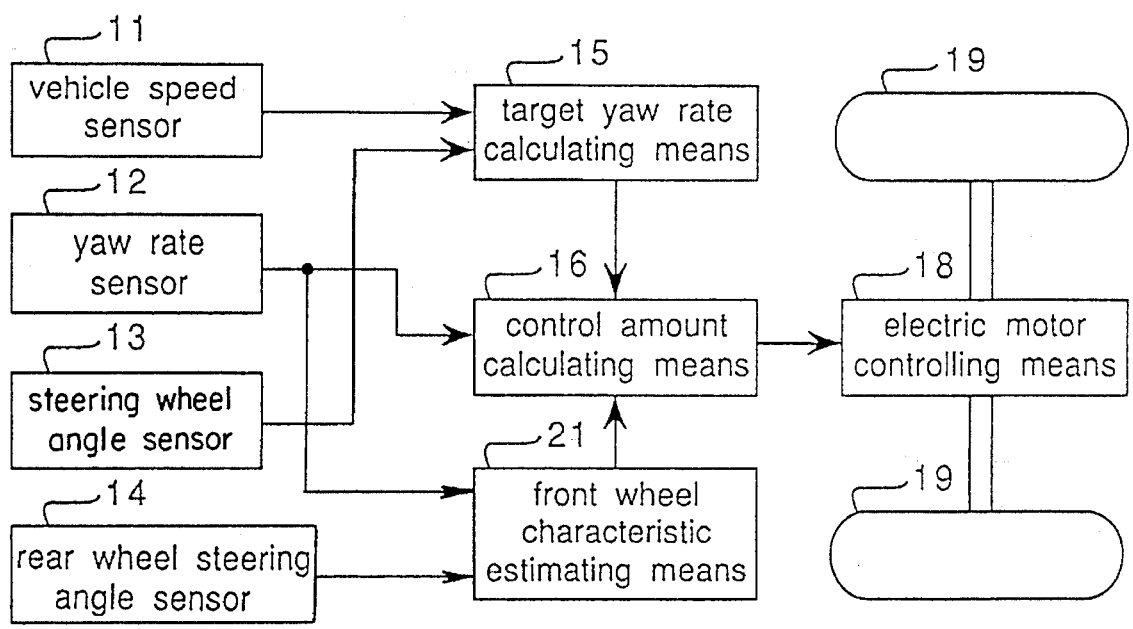
FIG. 2 is a view showing an apparatus for controlling a rear wheel steering angle of a four-wheel steering vehicle in accordance with a second embodiment of the present invention.

FIG. 2 shows a block diagram of a rear wheel steering angle controlling apparatus of a four-wheel steering vehicle in accordance with the second embodiment of the present invention.

Right and left rear wheels 19 are directly steered using an electric motor controlling means 18. An instruction signal to the electric motor controlling means 18 is calculated by a simple calculation by a control amount calculating means 16 using a front wheel characteristic estimating means 21 so that an actual yaw rate may follow a target yaw rate to be calculated by a target yaw rate calculating means 15 using the respective sensor output values of a vehicle speed sensor 11, a yaw rate sensor 12, a steering wheel angle sensor 13, and a rear wheel steering angle sensor 14.

In a second embodiment of the present invention, as it is considered that the front wheel steering angle $\theta f$ by the steering wheel steering is an external disturbance to the control system because of an unexpected input to the control system, the term $\theta f$ of equation (3) and a term which a coefficient that is a function of a vehicle speed V is related to are made unknown terms and are approximated by a known term before microtime L by a front wheel characteristic estimating means 21. The unknown terms can be expressed by the following equation.

$$a(V)\ddot{Y}(t) + b(V)\dot{Y}(t) - e\dot{\theta}f(t) - d(V)(\theta f(t) - \theta r(t-L)) \quad (20)$$

unknown term $$\approx -\ddot{Y}(t-L) + c\dot{\theta}r(t-L)$$

known term

The following equation is obtained by the equations (3), (4), and (20) in $e(t) = Ym(t) - Y(t)$.

$$\ddot{e}(t) + am\dot{e}(t) + bme(t) = \quad (21)$$

$$-\ddot{Y}(t-L) - am\dot{Y}(t) - bmY(t) + dmR(t) - c[\dot{\theta}r(t) - \dot{\theta}r(t-L)]$$

The following equation is obtained when the right side=φ.

$$\theta r(t) = 2\theta r(t-L) - \theta r(t-2L) + \{Ldm/c\}R(t) - \quad (22)$$

$$\{1/(Lc)\}[Y(t) - 2Y(t-L) + Y(t-2L)] -$$

$$\{am/c\}[Y(t) - Y(t-L)] - \{Lbm/c\}Y(t)$$

From $R(t) = \theta f(t)$, the following is obtained.

$$\theta r(t) = 2\theta r(t-L) - \theta r(t-2L) + \quad (23)$$

$$\{Ldm/c\}\theta f(t) - \{1/(Lc) + am/c + Lbm/c\}Y(t) +$$

$$\{2/(Lc) + am/c\}Y(t-L) - \{1/(Lc)\}Y(t-2L)$$

A front wheel steering angle $\theta f$ is given by the following equation from a steering wheel steering angle $\theta H$.

$$\theta f(t) = \theta H(t)/Ns$$

Ns: steering gear ratio

A steering wheel steering angle input is also considered an external disturbance by the second embodiment of the present invention. The above equation is a control input when the vehicle dynamic characteristic variation terms by a steering wheel steering angle input are estimated by an front wheel characteristic estimating means 21 using, i.e., equation (20). A control system capable of a high speed response by a simple control rule can be constructed using equation (23) with a control amount operation means 16. Especially superior characteristics are shown in a low vehicle speed region.

Figure 3:
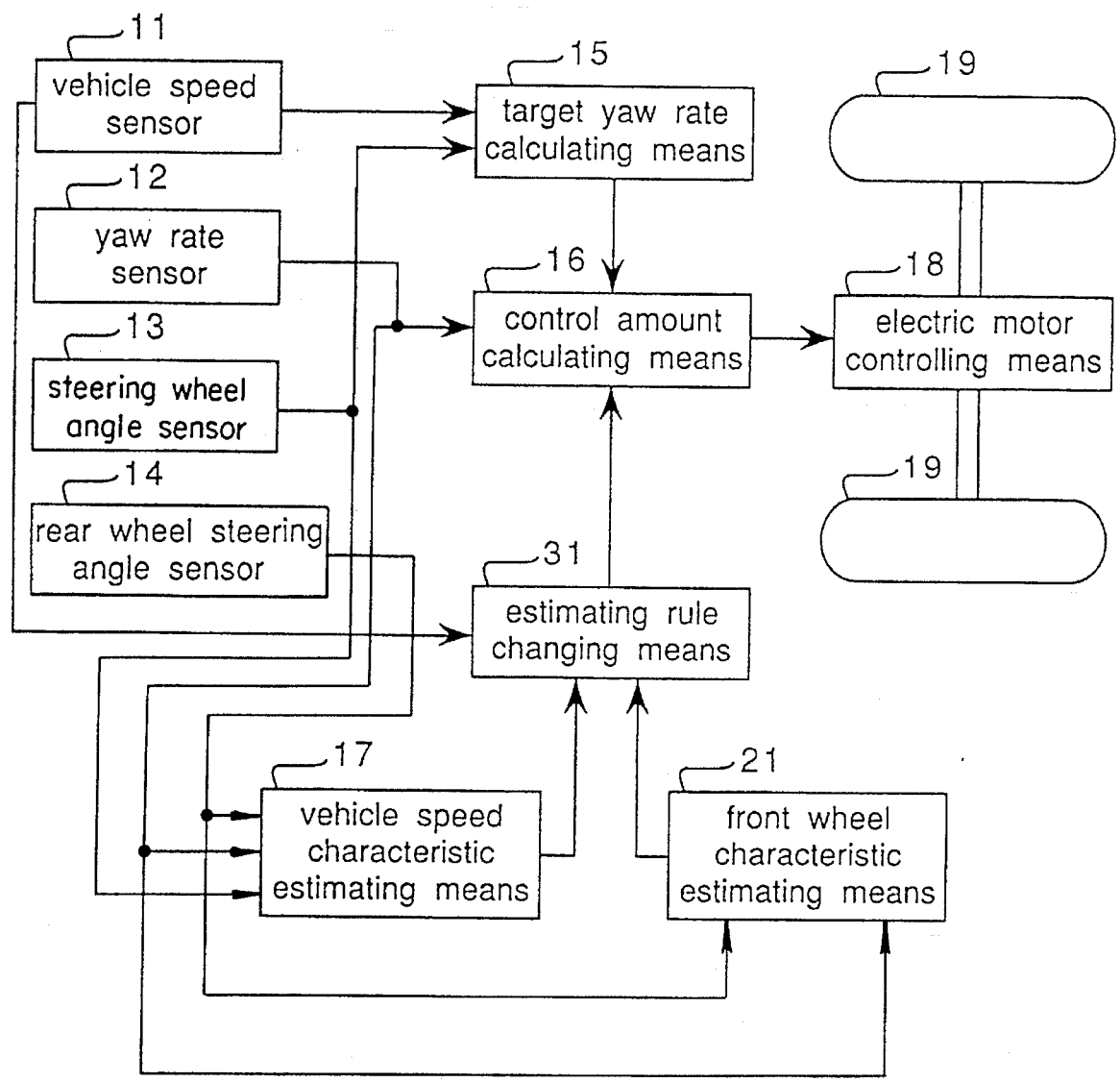
FIG. 3 is a view showing an apparatus for controlling a rear wheel steering angle of a four-wheel steering vehicle in accordance with a third embodiment of the present invention.

FIG. 3 shows as block diagram of an apparatus for controlling the rear wheel steering angle of a four-wheel steering vehicle in accordance with a third embodiment of the present invention. Right and left rear wheels 19 are directly steered using an electric motor controlling means 18. A vehicle speed characteristic estimating means 17 and a front wheel characteristic estimating means 21 are switched in accordance with a vehicle speed by an estimating rule changing means 31 so that an instruction signal to the electric motor controlling means 18 is calculated by a simple calculation by a control amount calculating means 16 so that an actual yaw rate may follow a target yaw rate calculated by a target yaw rate calculating means 15 using the respective sensor output values of a vehicle speed sensor 11, a yaw rate sensor 12, a steering wheel angle sensor 13, and a rear wheel steering angle sensor 14.

In the third embodiment of the present invention, the control input to the rear wheel is calculated using the front wheel characteristic estimating means as the unknown characteristic estimating rule in a low vehicle speed region and using a vehicle speed characteristic estimating means in a high vehicle speed region. Thus, a stable response capable of low speed region through high speed region can be obtained.

A control rule when a stable zero point is given to a yaw rate model in a fourth embodiment of the present invention is described hereinafter.

A reference model of a yaw rate when a zero point is given as a phase advancing element in the target yaw rate calculating means 15 is given by the following equation.

$$\ddot{Y}(t) + am\dot{Y}m(t) + bmYm(t) = Y_0(bmR(t) + pmR(t)) \quad (24)$$

$(Y_0bm=dm, R(t)=\theta f(t))$

In equation (3), the unknown term and the known term can be divided in two method of equations (6) and (20) as in described hereinabove. A control rule when the equation (20) in the second embodiment of the present invention is shown hereinafter as one example.

$$\theta r(t) = 2\theta r(t-L) - \theta r(t-2L) + \{Ldm/c\}R(t) + \quad (25)$$

$$\{Y_0pm/c\}\ [R(t) - R(t-L) - \{1/(Lc)\}][Y(t) -$$

$$2Y(t-L) + Y(t-2L)] - \{am/c\}[Y(t) - Y(t-L)] - \{Lbm/c\}Y(t)$$

From $R(t)=\theta f(t)$, the following is obtained.

$$\theta r(t) = 2\theta r(t-L) - \theta r(t-2L) + \quad (26)$$

$$\{(Ldm + Y_0pm)/c\}\theta f(t) - \{Y_0pm/c\}\theta f(t-L) -$$

$$\{1/(Lc) + am/c + Lbm/c\}Y(t) +$$

$$\{2/(Lc) + am/c\}Y(t-L) - \{1/(Lc)\}Y(t-2L)$$

The front wheel steering angle $\theta f$ is given by the following equation by a steering wheel steering angle $\theta H$.

$$\theta f(t) = \theta H(t)/Ns$$

Ns: steering gear ratio

The above equation is a control input when an unknown term has been estimated by the front wheel characteristic estimating means 21 when a zero point (pm>0) has been given to a yaw rate normal model by the target yaw rate calculating means 15 by the fourth embodiment of the present invention. By the use of pm in the equation (26) with a control input amount calculated by the control amount calculates means 16 in the case of estimating unknown term by the front wheel characteristic estimating means 21, the components of rear wheel steering angle steered in a reverse phase is calculated momentarily when rotating the steering wheel, thereby constituting a control system capable of reducing a side slip angle even during a transition time.

Figure 5A:
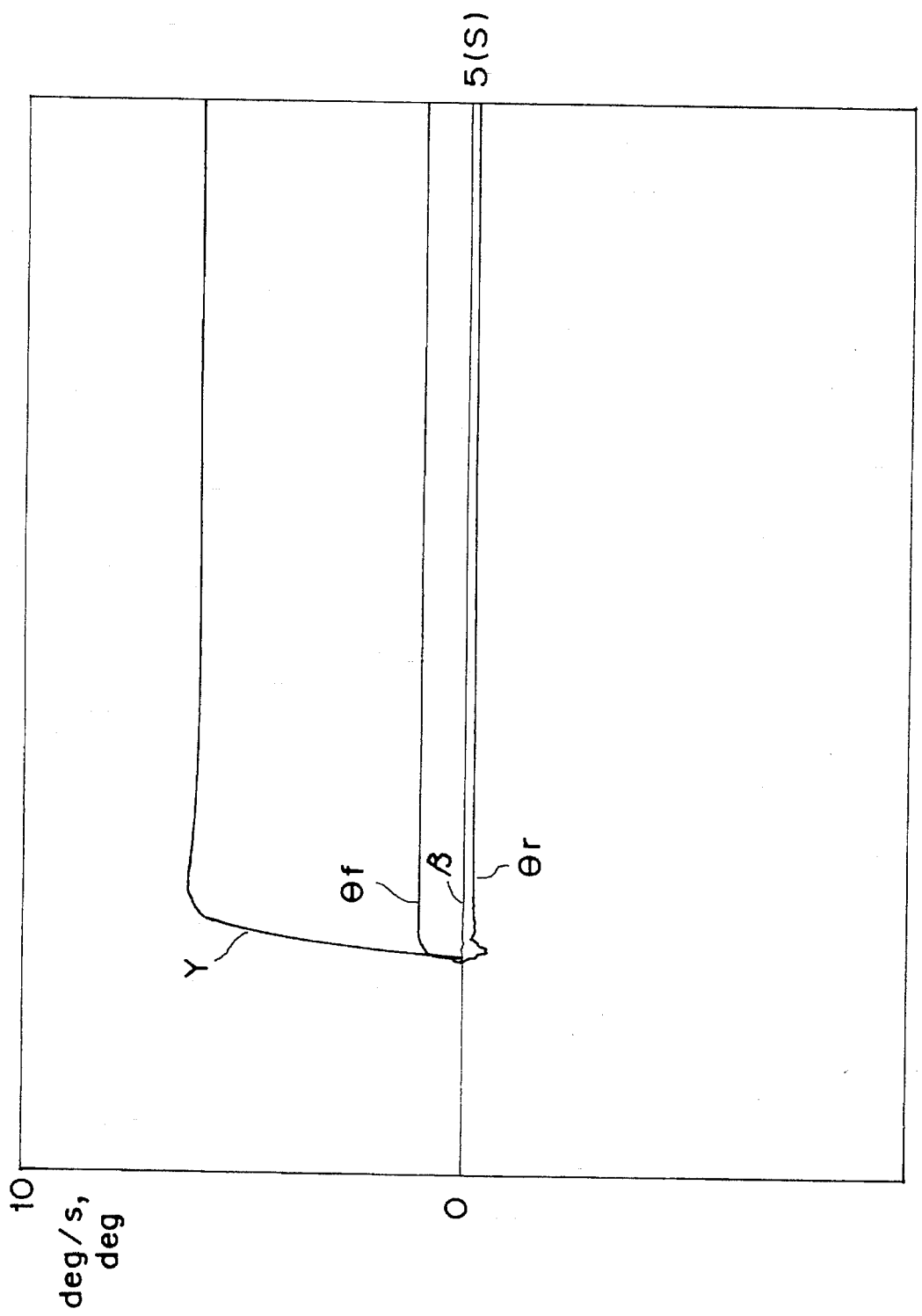

A circular turning, namely, a step response of the front wheel steering angle and a lane change, namely, simulation results of a rectangular wave response of the front wheel steering angle $\theta f$ are shown in FIG. 5(a), 5(b), 5(c), 6(a), 6(b), 6(c), 7 (a), 7 (b), and 7 (c). The graphs are control results at V=60 km/h, 120 km/h, and 250 km/h. A control period is L=0.02 (sec), coefficients of a target mode are am=20, bm=100, and pm=15. These graphs 5(a), 6(a), 7(a) are four seconds' simulation results when the front wheel steering angle has been steered by 1 (degree) in step after one second. In each variable, an ordinate is 10 (degree) at maximum with respect to an angle, and is 10 (deg/sec) at maximum with respect to a yaw rate. FIG. 5(b), 6(b), 7(b) are response waveforms when a front wheel steering angle has been steered by ±1 (degree) at a period of 0.5 Hz, and 10 seconds' simulation results. An ordinate in an upper graph is 10 in maximum value and an ordinate in a lower graph is 5 in maximum value.

An equation obtained by a two-wheel model and added dead time is used as a simulation model. Namely, a transfer function represented by the following equation is used.

$$\frac{Y(S)}{\theta f(S)} = Gf(S) * e^{-\tau s} \quad (27)$$

$$\frac{Y(S)}{\theta r(S)} = Gr(S) * e^{-\tau s}$$

Here, a useless time $\tau$ is expressed by $\tau=0.015$ (sec).

With the arrangement of FIGS. 5(a) to 7(c), it can be zero for the side slip angle $\beta$ at the normal time, and, even in the transitional period, the building up of real yaw rate Y is accelerated by the component of immediate reverse phase to follow fast to the target yaw rate whose side slip angle is zero, thereby preventing the generation of the side slip angle. Since the raising up of the yaw rate is fast in the simulation for the equation of V=250 Km/h of FIGS. 7(a)–7(c), the yaw rate component is adapted to cancel the reverse phase component, and the rear wheel $\Theta r$ does not become the reverse phase to follow the target yaw rate. In either of the cases, it is possible to get a control property having a side slip angle equal to zero by means of rear wheel steering, and it can be confirmed that it is a control system which is robust with respect to the vehicle speed.

FIGS. $8(a_1)$, $8(a_2)$, $8(b_1)$, and $8(b_2)$ show frequency response results at the vehicle speed V=60 km/h, 120 km/h, 250 km/h between the front wheel steering angle through the yaw rate when a control rule by the embodiment of the present invention is used, and results in a conventional vehicle. The characteristics shown in FIGS. $8(a_1)$ and $8(a_2)$ are characteristics in the conventional vehicle (2WS), while the characteristics shown in FIGS. $8(b_1)$ and $8(b_2)$ are frequency response results of vehicle in the case of employing the control rule by the fourth embodiment of the present invention. With the present invention, the phase delay can be improved, and the peak gain at a high speed can be reduced, thereby improving the stability at high speed. Also, even if the gain is lowered at less than 1 Hz, it can be flat up to the high frequency to be able to improve the operationability at the time of an emergency.

In addition, with the target yaw rate calculating means in equation (24), by giving the parameters am, bm, and pm of the transfer function for generating the target yaw rate with the function of condition variations in the vehicle it is possible to set the frequency response characteristics at an optional amount, for instance, it is possible to obtain a stable control characteristic in the whole range of vehicle speeds by setting the value Pm in the relationship with the vehicle speed becoming large at the low speed and small at the high speed.

FIG. 4 shows a block diagram of an apparatus for controlling the rear wheel steering angle of a four-wheel steering vehicle in accordance with a fifth embodiment of the present invention. Right and left rear wheels 19 are directly steered using an electric motor controlling means 18. A vehicle speed characteristic estimating means 17 and a front wheel characteristic estimating means 21 are switched in accordance with the vehicle speed by an estimating rule changing means 31 so that an instruction signal to the electric motor controlling means 18 is calculated with a simple calculation by a control amount calculating means 16 so that an actual yaw rate may follow a target yaw rate calculated by a target yaw rate calculating means 15 where a coefficient is given by a convergence characteristic changing means 41 using the respective sensor output values of a vehicle speed sensor 11, a yaw rate sensor 12, a steering wheel angle sensor 13, and a rear wheel steering angle sensor 14.

Figures 9A, 9B:
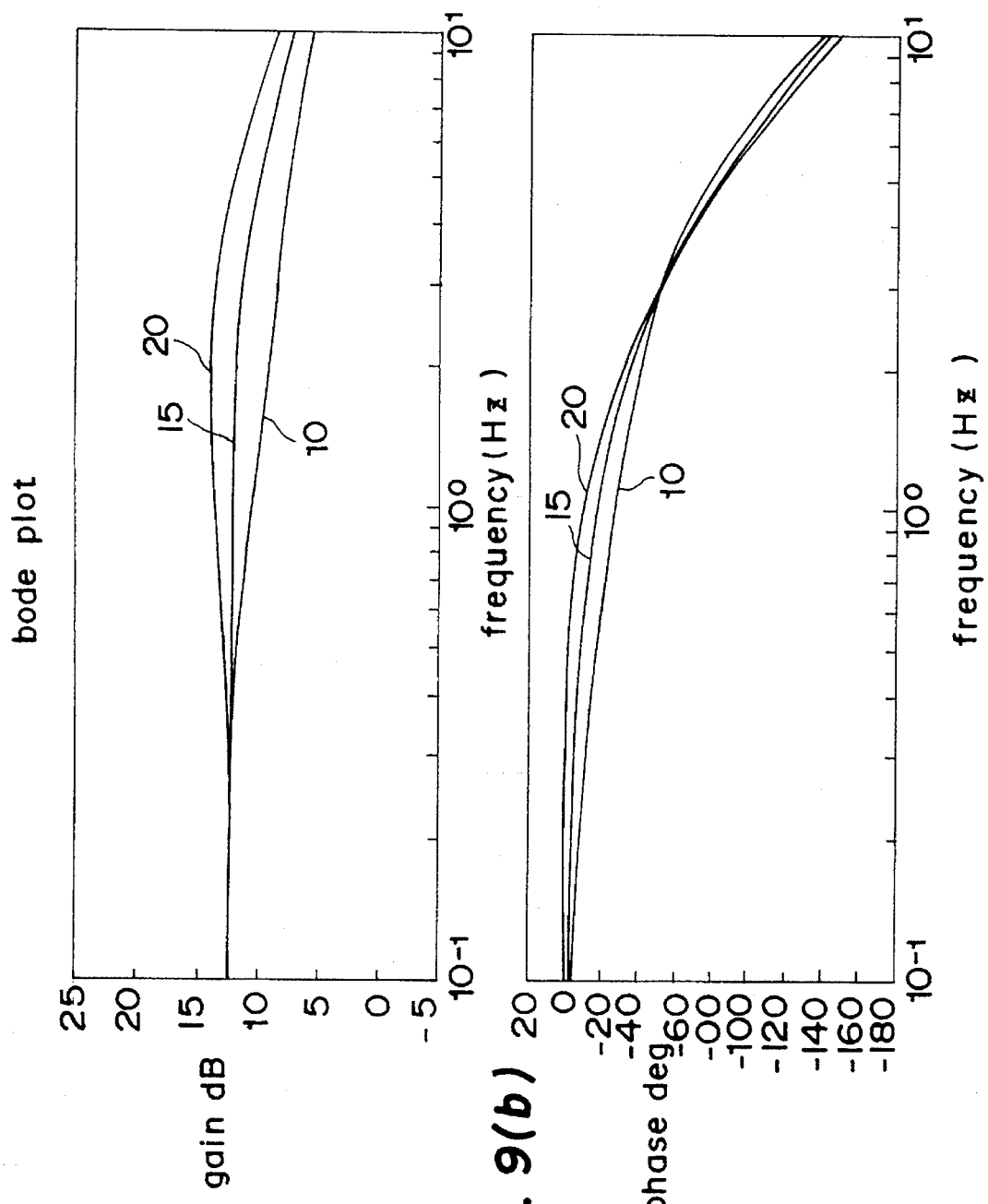
FIGS. 9(a)–9(b) are graphs of a closed loop transfer function when the coefficients of a yaw rate reference model have been changed.

In the fifth embodiment of the present invention, respective coefficients of a yaw rate reference model given by the equation (24) are changed in accordance with a vehicle speed by a spreading characteristic changing means 41 so that the response property of the vehicle is improved, and the side slip angle at the transition time can be reduced. FIGS. 9(a) and 9(b) show a closed loop transfer characteristic between the front wheel steering angle and the yaw rate when pm has been changed as one example. Results are provided at control period L=0.02 sec, am=20, bm=100, a vehicle speed V=120 km/h. Since the control characteristics of the vehicle changes with a change in the pm, the pm is given with a map corresponding to the vehicle speed so that a superior control performance corresponding to the vehicle speed can be obtained.

Although a control system is designed using only a reference model of a yaw rate in the present embodiment, a reference model of a side slip angle β may be added. A similar design can be effected using the reference model of the side slip angle. Although a differential value of a yaw rate value or the like is given by a difference equation before one sampling, a difference equation before two or more samplings will do. A direct differential value measured by a sensor may be used. In the present embodiment, although a secondary delay model and a secondary delay+a primary advance model are used for a yaw rate example model, a primary delay model, a secondary delay+a secondary advance model or the like may be used. Although only the pm is given as a function of a vehicle speed in a fourth embodiment of the present invention, other coefficients am, bm, and dm may be given with the functions of the vehicle speed.

Figure 10:
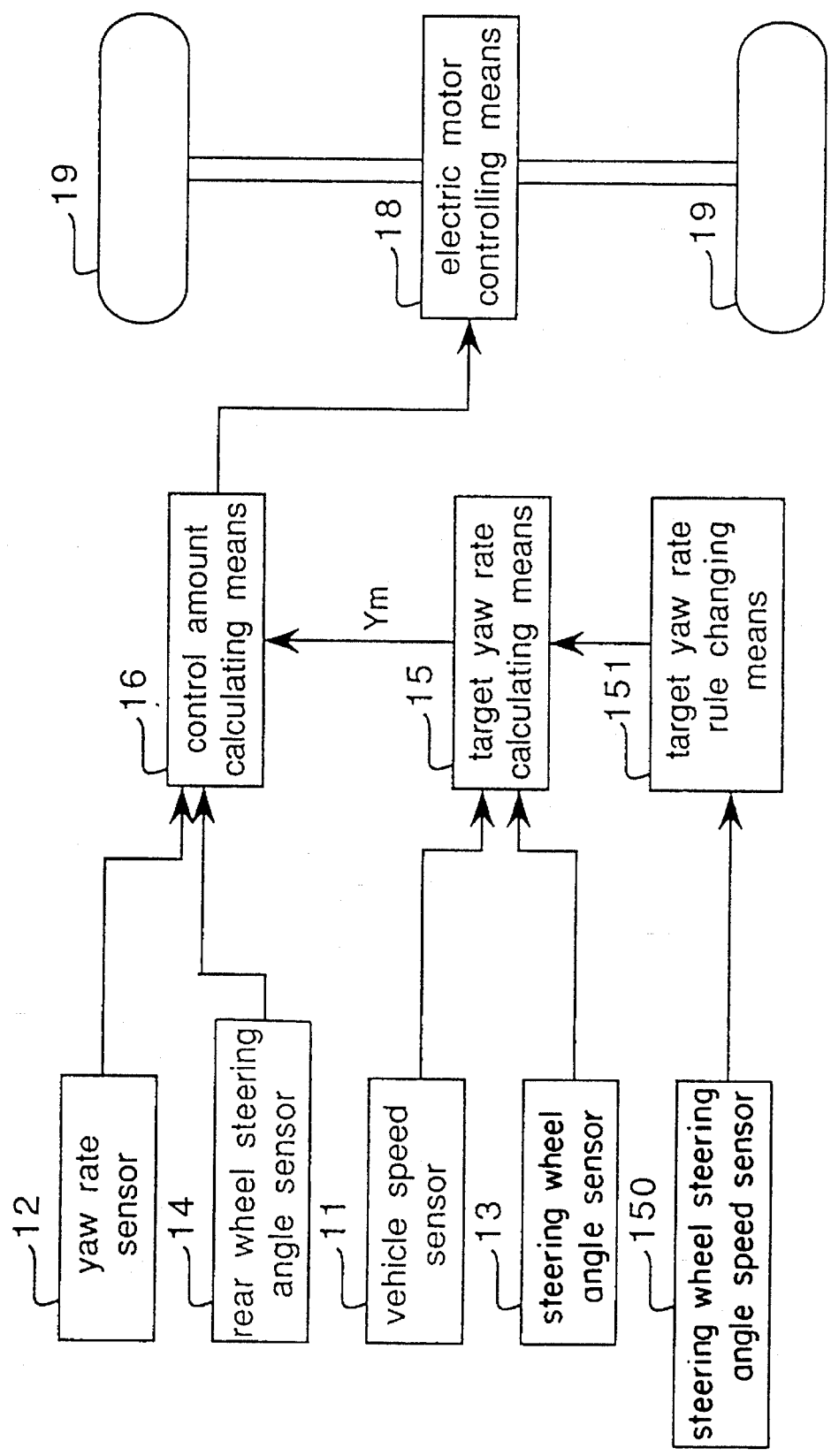
FIG. 10 is a view of a sixth embodiment of the present invention.

A sixth embodiment of the present invention is described hereinafter. FIG. 10 shows a block diagram of an apparatus for controlling the rear wheel steering angle of a four-wheel steering vehicle of the present invention. Right and left rear wheels 19 are directly steered using an electric motor controlling means 18. An instruction signal to the electric motor controlling means 18 is calculated with a simple calculation by a control amount calculating means 16 so that an actual yaw rate may follow a target yaw rate calculated by a target yaw rate calculating means 15 using the respective sensor output values of a vehicle speed sensor 11, a yaw rate sensor 12, a steering wheel angle sensor 13, and a rear wheel steering angle sensor 14. The calculation rule to be used by the above described target yaw rate calculating means 15 is change in accordance with the value of a steering wheel steering angle speed which is an output value of the steering wheel steering angle speed sensor 150 by a target yaw rate rule changing means 151.

The algorithm used by this embodiment is described hereinafter.

A vehicle model of a two degree of freedom system is represented by the following equation.

$$\begin{vmatrix} \dot{Y} \\ \dot{\beta} \end{vmatrix} = \begin{vmatrix} -a11 & -a12 \\ -a21 & -a22 \end{vmatrix} \begin{vmatrix} Y \\ \beta \end{vmatrix} + \begin{vmatrix} b1r \\ b2r \end{vmatrix} \theta r + \begin{vmatrix} b1f \\ b2f \end{vmatrix} \theta f \quad (28)$$

$a11 = 2(lf^2 kf + lr^2 kr)/IV$
$a12 = 2(lfkf - lrkr)/I$
$a21 = 1 + 2(lfkf - lrkr)/mV^2$
$a22 = 2(kf + kr)/mV$ $b1r = -2lrkr/I$
$b2r = 2kr/mV$
$b1f = 2lfkf/I$
$b2f = 2kf/mV$ where Y: yaw rate, β: side slip angle, θr: rear wheel steering angle, θf: front wheel steering angle, lr: distance to rear axle from the center of gravity (CG), lf: distance to front axle from the center of gravity, kr: cornering stiffness at rear wheels, kf: cornering stiffness at front wheels, I: yaw moment of inertia, m: vehicle mass, and V: vehicle speed.

From the equation (28), the following is obtained.

$Y(s) = Gr(s)\theta r(s) + Gf(s)\theta f(s)$ (29)
$Gr(s) = [b1rS + a22b1r - a12b2r]/[S^2 + (a11 + a22)S + a11a22 - a12a21]$
$= (cS - d)/(S^2 + aS + b)$
$Gf(s) = [b1fS + a22b1f - a12b2f]/[S^2 + (a11 + a22)S + a11a22 - a12a21]$
$= (eS + d)/(S^2 + aS + b)$ $c = b1r, e = b1f,$
$d = -a22b1r + a12b2r = a22b1f - a12b2f = 4kfkr(lf + lr)/(ImV)$
$a = a11 + a22, b = a11a22 - a12a21$ Expanding the above equation, the following is obtained.

$\ddot{Y}(t)+a(V)\dot{Y}(t)+b(V)Y(t)=c\dot{\theta}r(t)-d(V)\theta r(t)+e\dot{\theta}f(t)+d(V)\theta f(t)$ (30)

In the above equation, coefficients a, b, and d are functions of a vehicle speed V. As the θf is an unexpected input, it may be considered an external disturbance to the system. A reference model of a target yaw rate to be changed by a target yaw rate rule changing means 151 is given, as one example, by two equations of a reference model when the following zero point is not given, and a reference model when a zero point is given as a phase advance element.

A reference model when a zero point is not provided is given by the following equation.

$\ddot{Y}m(t)+am\dot{Y}m(t)+bmYm(t)=Y_0(bmR(t)) \ (Y_0bm=dm, R(t)=\theta f(t))$ (31)

A transfer function F(S) where a zero point does not exist is given by the following equation.

$$\frac{Ym(S)}{\theta f(S)} = F(S) = \frac{Y_0 bm}{S^2 + amS + bm} \quad (32)$$

A reference model of a yaw rate when a zero point is given as a phase advance element is given by the following equation.

$\ddot{Y}m(t)+am\dot{Y}m(t)+bmYm(t)=Y_0(bmR(t)+pm\dot{R}(t))$ (33)

$(Y_0bm=dm, R(t)=\theta f(t))$

A transfer function G(S) having a zero point is given by the following equation.

$$\frac{Ym(S)}{\theta f(S)} = G(S) = \frac{Y_0(pmS + bm)}{S^2 + amS + bm} \quad (34)$$

$Y_0$ is a stationary yaw rate gain to be determined when $\beta(S)/\theta f(S)=0$ (β: side slip angle) is provided with a two-wheel model and is expressed by the following equation.

$Y_0 = (b1f - b2f*b1r/b2r)/(-a11 + a21*b1r/b2r)$ (35)
$= 2kf(lf + lr)V/(2kflf(lf + lr) + lrmV^2)$ A term of θf of the equation (30) and a term which a coefficient that is a function of a vehicle speed V is related to is provided as unknown terms, and are approximated by a known term before a microtime L. The unknown terms can be expressed by the a following equation.

$a(V)\dot{Y}(t) + b(V)Y(t) - e\dot{\theta}f(t) - d(V)(\theta f(t) - \theta r(t - L))$ (36)

unknown term

-continued $$\cong -\ddot{Y}(t-L) + c\dot{\theta}r(t-L)$$

known term

A control rule when a zero point does not exist in a reference model is determined.

The following equation is obtained from equations (30), (31), and (36) when a deviation between a target yaw rate and a real yaw rate is put into e(t)=Ym(t)−Y(t).

$$\ddot{e}(t) + am\dot{e}(t) + bme(t) = \quad (37)$$
$$-\ddot{Y}(t-L) - am\dot{Y}(t) - bmY(t) + dmR(t) - c[\dot{\theta}r(t) - \dot{\theta}r(t-L)]$$

In a right side = $K1e(t), k2\dot{e}(t)$ $$\ddot{e}(t) + am\dot{e}(t) + bme(t) = ke(t)$$

Select k1 and k2 optionally and a spreading performance to be desired into a target yaw rate can be obtained. As k1 and k2=φ, a rear-wheel steering angle θr(t) which is a control input is obtained from equation (8).

A differential value is calculated by the following difference equation with a sampling period being provided as L.

$$\dot{\theta}r(t)=[\theta r(t)-\theta r(t-L)]/L \quad (39)$$

The following equation is obtained when the right side =0.

$$\theta r(t) = 2\theta r(t-L) - \theta r(t-2L) + \{Ldm/c\}R(t) - \{1/(Lc)\}[Y(t) - \quad (40)$$
$$2Y(t-L) + Y(t-2L)] - \{am/c\}[Y(t) - Y(t-L)] - \{Lbm/c\}Y(t)$$

From R(t)=θf(t), the following is obtained.

$$\theta r(t) = 2\theta r(t-L) - \theta r(t-2L) + \{Ldm/c\}\theta f(t) - \quad (41)$$
$$\{1/(Lc) + am/c + Lbm/c\}Y(t) + \{2/(Lc) + am/c\}Y(t-L) -$$
$$\{1/(Lc)\}Y(t-2L)$$

A control rule when a zero point exists in a reference model of a target yaw rate is also given by the following equation from the equations (30), (34), and (36).

$$\theta r(t) = 2\theta r(t-L) - \theta r(t-2L) + \{Ldm/c\}R(t) + \quad (42)$$
$$\{Y_0 pm/c\}[R(t) - R(t-L)] - \{1/(Lc)\}[Y(t) - 2Y(t-$$
$$L) + Y(t-2L)] - \{am/c\}[Y(t) - Y(t-L)] - \{Lbm/c\}Y(t)$$

From R(t)=θf(t), the following is obtained.

$$\theta r(t) = 2\theta r(t-L) - \theta r(t-2L) + \{(Ldm + Y_0 pm)/c\}\theta f(t) - \quad (43)$$
$$\{Y_0 pm/c\}\theta f(t-L) - \{1/(Lc) + am/c + Lbm/c\}Y(t) +$$
$$\{2/(Lc) + am/c\}Y(t-L) - \{1/(Lc)\}Y(t-2L)$$

The front wheel steering angle θf is given by the following equation from a steering wheel steering angle θH.

$$\theta f(t)=\theta H(t)/Ns$$

Ns: steering gear ratio

The equations (41) and (43) are switched with the values of a steering wheel steering angle speed and a vehicle speed by a target yaw rate rule changing means of the present invention. For example, when a steering wheel steering angle speed is small, namely, in a slower steering wheel operation, a target rear wheel steering angle is calculated by a control rule with a reference model where a zero point of the equation (41) is not provided. When the steering wheel steering angle speed is higher, namely, when the steering wheel is quickly manipulated, a target yaw rate is followed which is calculated by a reference model having a zero point of the equation (43), namely, having a phase advance element, which causes an advantage that a target yaw rate at a transition time is made larger equivalently to accelerate the increase of the actual yaw rate.

Figure 11:
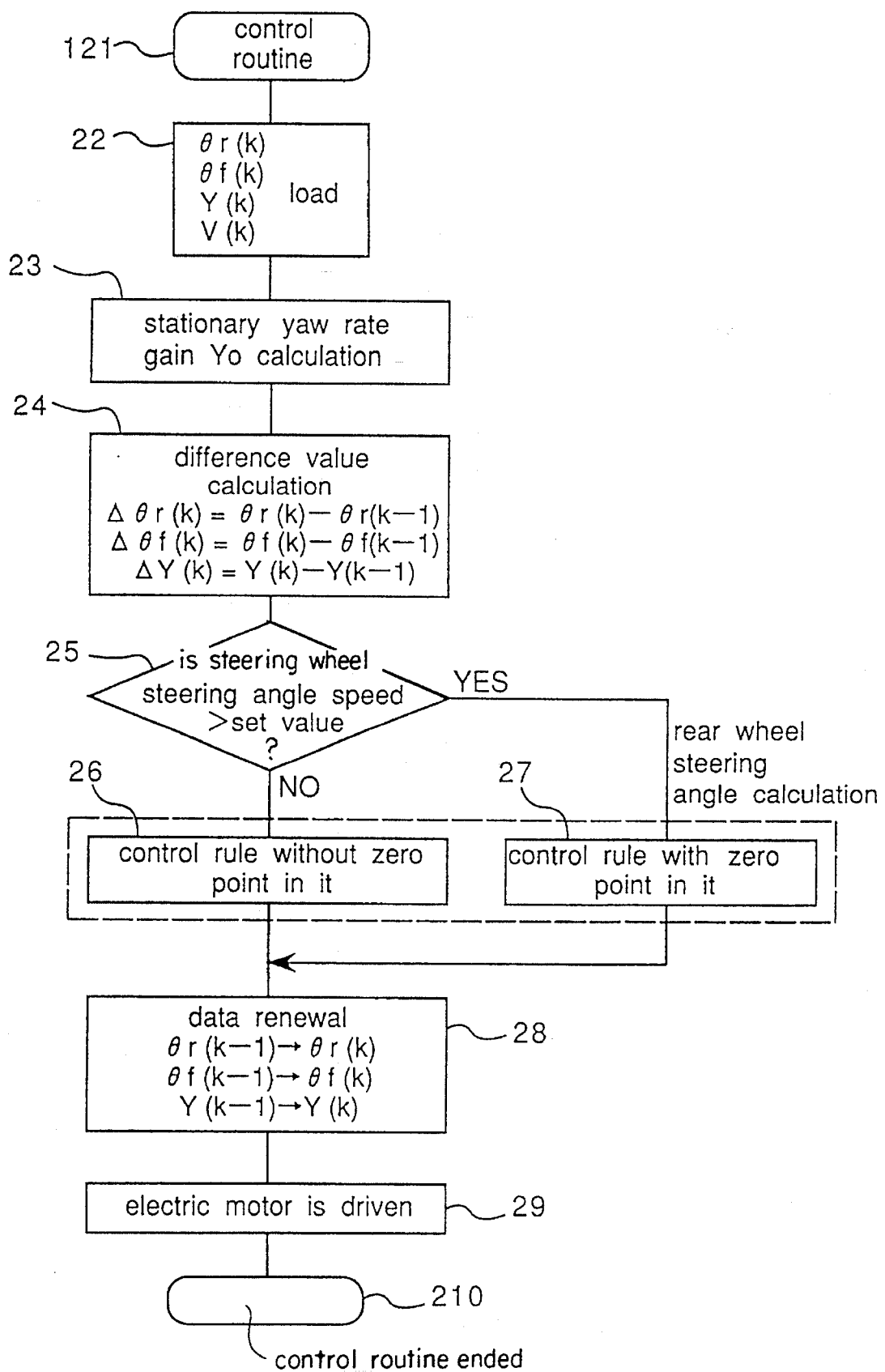
FIG. 11 is a flowchart indicating the operation of the sixth embodiment of the present invention.

A control flow in a present embodiment is shown in FIG. 11.

A control routine of a step 121 is carried out for each control period. At a step 22, a rear wheel steering angle θr, a front wheel steering angle θf, a real yaw rate Y, and a vehicle speed V are loaded and a stationary yaw rate gain $Y_0$ corresponding to the vehicle speed is calculated by a step 23. A difference value of each data to be used by a control rule calculation is calculated by a step 24. When the steering wheel steering angle speed is determined to be larger than a certain set value in a step 25, namely, a quick steering wheel steering operation is effected, a target rear wheel angle is calculated using a control rule where a zero point exists at a step 27. On the other hand, when the steering wheel steering speed is smaller than the set value, namely, when a normal steering wheel steering operation is effected, a rear wheel steering angle is calculated using a control rule where a zero point does not exist at a step 26. The respective data are renewed at a step 28. An electric motor is driven so that the rear wheel steering angle may become a calculated target rear wheel steering angle at a step 29. A control routine is finished by a step 210.

A reference model corresponding to a steering wheel steering angle speed is given so that a smooth stable traveling control operation can be effected at a normal steering wheel steering time, and an obstruction can be avoided safely by making a reverse phase component larger in emergency steering operations such as collision avoidance and so on and by improving the rotation property.

Although two reference models are adapted to be switched in accordance with a steering wheel steering speed in a target yaw rate rule changing means in the present embodiment, the zero point of the reference model may be changed in accordance with the steering wheel steering speed. The value of the zero point is also increased if the steering wheel steering angle speed is larger. The value of the zero point is also decreased if the steering wheel steering angle speed is smaller. The reference model of a target yaw rate is changed, considering the value of the steering wheel steering angle in the target yaw rate rule changing means. Although a secondary delay model and a secondary delay+a primary advance model are used in the yaw rate reference model in the present embodiment, the model of another order may be used.

A seventh embodiment of the present invention will is described hereinafter.

When signals of the yaw rate sensor itself are likely to be influenced by noise even in either of the above described embodiments, and a first order differential value, a second-story differential value and so on cannot be directly obtained with better accuracy, the noise is removed through a filter for use in inputs of the control amount calculation. In order to remove noise of differential values of the yaw rate enough so as not to influence upon rear wheel, a cut off frequency of the filter has to be lowered, which causes a problem in that the phase delay of the whole yaw rate feedback loop becomes larger, thus deteriorating the control performance. When a sensor for directly obtaining a two-story differential value does not exist, the differential value is obtained by a difference equation. The reliability of a high order differential value is considerably lowered by a way of obtaining the calculation period. The present embodiment solves such a problem.

Figure 12:
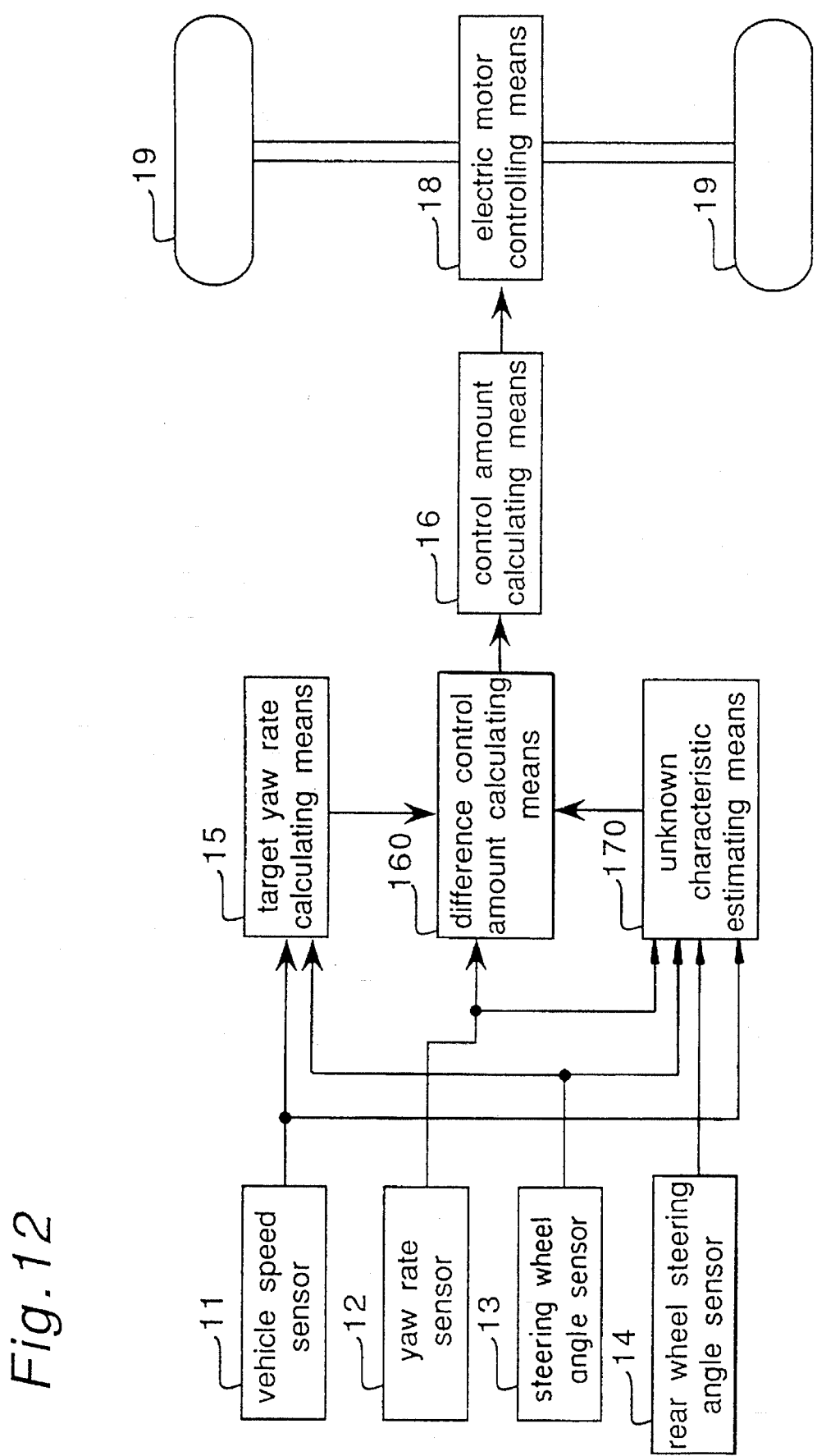
FIG. 12 is a view of a seventh embodiment of the present invention.

FIG. 12 shows a block diagram of the present embodiment. It is to be noted that like parts are designated by like reference numerals throughout the accompanying drawings.

The algorithm used by the present embodiment is described hereinafter.

A vehicle model of a two degree of freedom system is represented by the following equation.

$$\begin{vmatrix} \dot{Y} \\ \dot{\beta} \end{vmatrix} = \begin{vmatrix} -a11 & -a12 \\ -a21 & -a22 \end{vmatrix} \begin{vmatrix} Y \\ \beta \end{vmatrix} + \begin{vmatrix} b1r \\ b2r \end{vmatrix} \theta r + \begin{vmatrix} b1f \\ b2f \end{vmatrix} \theta r \quad (44)$$

$a11 = 2(lf^2 kf + lr^2 kr)/IV \qquad a12 = 2(lfkf - lrkr)/I$ $a21 = 1 + 2(lfkf - lrkr)/mV^2 \qquad a22 = 2(kf + kr)/mV$ $b1r = -2lrkr/I \qquad b2r = 2kr/mV$ $b1f = 2lfkf/I \qquad b2f = 2kf/mV$ where Y: yaw rate, $\beta$: side slip angle, $\theta r$: rear wheel steering angle, $\theta f$: front wheel steering angle, lr: distance to rear axle from the center of gravity (CG), lf: distance to front axle from the center of gravity, kr: cornering stiffness at rear wheels, kf: cornering stiffness at front wheels, I: yaw moment of inertia, m: vehicle mass, and V: vehicle speed.

From the equation (44), the following is obtained.

$$\begin{aligned} Y(s) &= Gr(s)\theta r(s) + Gf(s)\theta f(s) \quad (45)\\ Gr(s) &= [b1rS + a22b1r - a12b2r]/[S^2 + (a11 + \\ & \quad a22)S + a11a22 - a12a21]\\ &= (cS - d)/(S^2 + aS + b)\\ Gf(s) &= [b1fS + a22b1f - a12b2f]/[S^2 + (a11 + \\ & \quad a22)S + a11a22 - a12a21]\\ &= (eS + d)/(S^2 + aS + b)\\ c &= b1r, \ e = b1f,\\ d &= -a22b1r + a12b2r = a22b1f - a12b2f =\\ & \quad 4kfkr(1f + 1r)/(ImV)\\ a &= a11 + a22, b = a11a22 - a12a21 \end{aligned}$$

Expanding the above equation, the following is obtained.

$$\ddot{Y}(t) + a(V)\dot{Y}(t) + b(V)Y(t) = c\dot{\theta}r(t) - d(V)\theta r(t) + e\dot{\theta}f(t) + d(V)\theta f(t) \quad (46)$$

In the above equation, coefficients a, b, and d are functions of the vehicle speed V. As the $\theta f$ is an unexpected input, it may be considered an external disturbance to the system.

A reference model of the yaw rate is given by the following equation.

$$\ddot{Y}m(t) + am\dot{Y}(t) + bmYm(t) = Y(bmR(t) + pm\dot{R}(t)) \quad (47)$$

$(Y_0 bm = dm, Y_0 bm = pm1, R(t) = \theta f(t))$ $Y_0$ is a stationary yaw rate gain to be determined when $\beta(S)/\theta f(S) = 0$ ($\beta$: side slipping angle) is provided with a two-wheel model and is expressed by the following equation.

$$\begin{aligned} Y_0 &= (b1f - b2f^* b1r/b2r)/(-a11 + a21^* b1r/b2r) \quad (48)\\ &= 2kf(1f + 1r)V/(2kflf(1f + 1r) + 1rmV^2) \end{aligned}$$

In the present embodiment, a term which a coefficient that is a function of a vehicle speed V of the equation (46) is related to is approximated as an unknown term with a known term before a microtime L by an unknown characteristic estimating means 170. Namely, the unknown term is represented by the following equation.

$$a(V)\dot{Y}(t) + b(V)Y(t) = d(V)[\theta r(t) - \theta f(t)] \quad (49)$$

unknown term $\approx -\ddot{Y}(t - L) + c\dot{\theta}r(t - L) + e\dot{\theta}f(t - L)$ known term Although the right side of the equation (49) is made a known term, and the left side is made an unknown term in the present embodiment, all the terms of the rear wheel steering angle are made known terms. All the terms with respect to the front wheel steering angle may be made unknown terms.

The following equation can be obtained from equations (46) and (47) where e(t)=Ym(t)−Y(t).

$$\begin{aligned} \ddot{e}(t) &= \ddot{Y}m(t) - \ddot{Y}(t) \quad (50)\\ &= -am\dot{Y}m(t) - bmYm(t) + dmR(t) + pm1\dot{R}(t) +\\ & \quad \underline{a(V)\dot{Y}(t) + b(V)Y(t) + d(V)[\theta r(t) - \theta f(t)]} -\\ & \quad c\dot{\theta}r(t) - e\dot{\theta}f(t) \end{aligned}$$

An error dynamics before a microtime L is given from the above equation in accordance with a following equation.

$$\begin{aligned} \ddot{e}(t - L) &= -am\dot{Y}m(t - L) - bmYm(t - L) + dmR(t - L) + \quad (51)\\ & \quad pm1\dot{R}(t - L) + \underline{a(V)\dot{Y}(t - L) + b(V)Y(t - L) + d(V)[\theta r(t - L) -}\\ & \quad \underline{\theta f(t - L)]} - c\dot{\theta}r(t - L) - e\dot{\theta}f(t - L) \end{aligned}$$

Substituting the equations (46) and (49) into the underlined portions of the above equation, and subtracting the difference of the equations (50) and (51) for rearrangement, the following is obtained.

$$\Delta\ddot{e}(t) + am\Delta\dot{e}(t) + bm\Delta e(t) = -am\Delta\dot{Y}(t) - bm\Delta Y(t) + \quad (52)$$
$$dm\Delta R(t) + pm1\Delta\dot{R}(t) - c\Delta\dot{\theta}r(t) - e\Delta\dot{\theta}f(t)$$

In right side = $K1\Delta e(t) + K2\Delta\dot{e}(t)$ $$\Delta\ddot{e}(t) + am\Delta\dot{e}(t) + bm\Delta e(t) = k1\Delta e(t) + k2\Delta\dot{e}(t) \quad (53)$$

Select K1 and K2 optionally, and the spreading performance to be desired to $\Delta e(t) \to 0$ can be obtained. A rear wheel steering angle $\theta r(t)$ which is a control input that becomes $e(t) \to 0$ from the equation (10) is obtained as K1 and k2=0.

A control rule which becomes $\Delta e(t) \to 0$ is represented by the next equation.

$$c\Delta\dot{\theta}r(t) = -e\Delta\dot{\theta}f(t) - am\Delta\dot{Y}(t) - bm\Delta Y + dm\Delta R(t) + pm1\Delta\dot{R}(t) \quad (54)$$

A control rule which becomes $e(t) \to \phi$ is expressed by the following equation.

$$c\dot{\theta}r(t) = -e\dot{\theta}f(t) - am\dot{Y}(t) - bmY(t) + dmR(t) + pm1\dot{R}(t) \quad (55)$$

A differential value is calculated by the following difference equation with a sampling period being provided as L.

The following equation is obtained from (55) equation.

$$\dot{\theta}r(t) = [\theta r(t) - \theta r(t - L)]/L \quad (56)$$

From $R(t) = \theta f(t)$, $$\theta r(t) = \theta r(t - L) - (e/c)[\theta f(t) - \theta f(t - L)] + \quad (57)$$
$$(Ldm/c)\theta f(t) + (pm1/c)[\theta f(t) - \theta f(t - L)] - (am/c)\ [Y(t) -$$

-continued $$Y(t-L)] - (Lbm/c)Y(t)$$

A front wheel steering angle θf is given by the following equation from a handle steering angle θH.

$$θf(t)=θH(t)/Ns$$

Ns: steering gear ratio

The above equation is a control input when a two-order differential value of a yaw rate is not used by the embodiment of the present invention. A control which can follow the target yaw rate can be realized without the use of a two-order differential value that is low in reliability by the use of equation (50).

Although a control rule which requires a two-story differential value of the yaw rate is used in the conventional TDC as described hereinabove, a control which can follow the target yaw rate without the use of the two-story differential value can be used by the present embodiment.

An eighth embodiment of the present invention is described hereinafter. The present embodiment removes a disadvantage in that a small turning property at a starting time cannot be obtained, because a stationary target yaw rate also becomes zero when the vehicle speed is zero in a target yaw rate following system.

Figure 13:
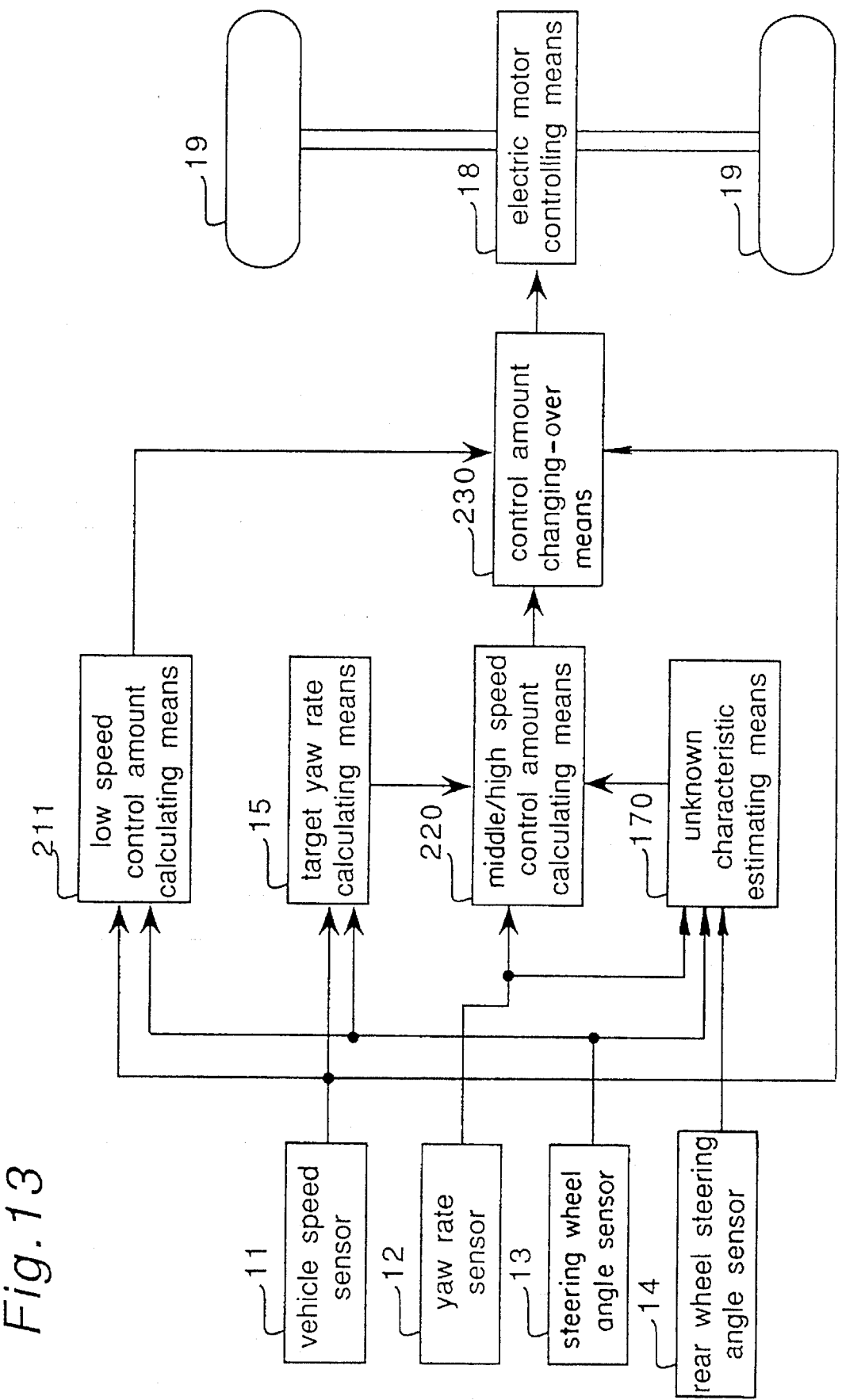
FIG. 13 is a view of an eighth embodiment of the present invention.

FIG. 13 shows a block diagram of the present embodiment.

In the present embodiment, a target rear wheel steering angle is calculated by a low speed control amount calculating means 211 when a vehicle speed has been judged to be lower than a certain set value by a control amount changing-over means 230.

$$θr(t)=K(V)*θf(t) \quad (58)$$

Accordingly, a small turning property at a starting time and a low speed time can be obtained. When a vehicle speed has been judged to be higher than a certain set value by a control amount changing-over means 230, a target rear wheel steering angle is calculated with a target yaw rate following control rule superior in high speed safety, non-linear region and external disturbance safety by a middle/high speed control amount calculating means 220. As one example, a target rear wheel steering angle is calculated by the following equation.

$$θr(t) = θr(t-L) - (e/c)[θf(t) - θf(t-L)] + (Ldm/c)θf(t) + \quad (59)$$
$$(pm1/c)[θf(t) - θf(t-L)] - (am/c)[Y(t) - Y(t-L)] - (Lbm/c)Y(t)$$

In accordance with the present embodiment, a four-wheel steering system can cope with all the requirements by the use of a control rule which makes much of a small turning property in a low speed region, and a TDC control capable of retaining a high speed safety property in a high speed region.

Figure 14:
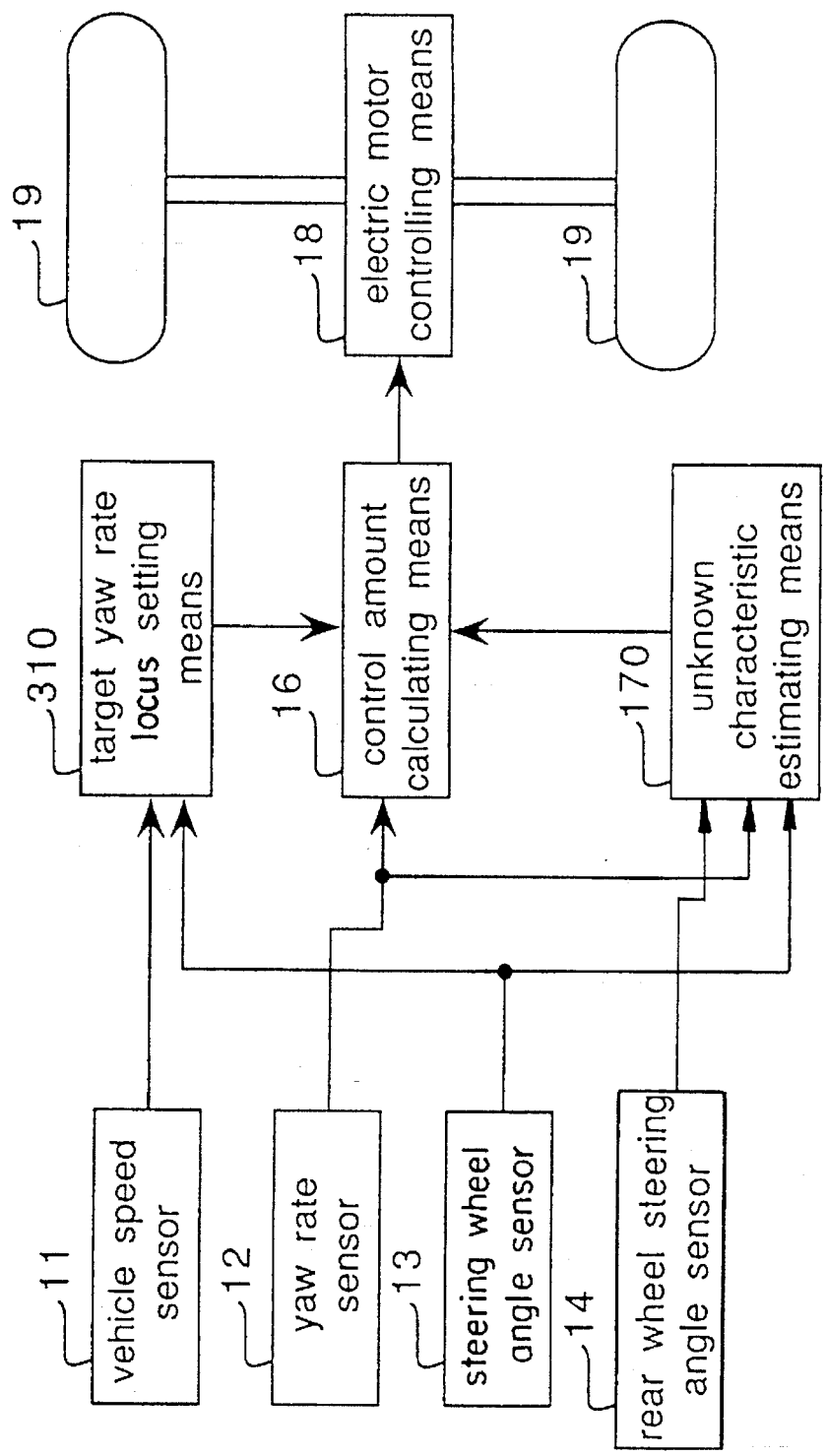
FIG. 14 is a view of a ninth embodiment of the present invention.

A ninth embodiment of the present invention is described hereinafter. FIG. 14 shows a block diagram of the present embodiment. A target track of the yaw rate is Yd, and a deviation with respect to the real yaw rate Y is E.

$$E=Yd-Y \quad (60)$$

Yd is calculated by a target yaw rate locus setting means on the employment of detected values by, for instance, the vehicle speed sensor 11 and the steering wheel angle sensor 13.

The following equation for governing the dynamic characteristics of the error is obtained from equations (46) and (60).

$$\ddot{E}(t) = \ddot{Y}d + a(V)\dot{Y}(t) + b(V)Y(t) - c\dot{θ}r(t) + d(V)θr(t) - e\dot{θ}f(t) - d(V)θf(t) \quad (61)$$

where right side = $K1E(t) + k2\dot{E}(t)$ $$\dot{E}(t) = k1E(t) + k2\dot{E}(t) \quad (62)$$

Select K1 and K2 optionally, and a spreading performance to be desired to E(t)→0 can be obtained. An equation to fill in a rear-wheel steering angle θr(t) which is a control input that becomes E(t)→0 from the unknown characteristic estimating means 170, i.e., the equations (49), (61), and (62) becomes the following equation.

$$\ddot{Y}d(t)-\ddot{Y}(t-L)-c[\dot{θ}r(t)-\dot{θ}r(t-L)]-e[\dot{θ}f(t)-\dot{θ}f(t-L)]=k1E(t)+k2\dot{E}(t) \quad (63)$$

Rearrange the above equation, and the following results.

$$θr(t)=θr(t-L)-(e/c)[θf(t)-θf(t-L)]-(1/c)[\ddot{Y}d(t)-\ddot{Y}(t-L)-k1E(t)-k2\dot{E}(t)] \quad (64)$$

The rear wheel target steering angle θr(t) is obtained from the equation (64) by the substitution of a difference equation such as the equation (56) or the like.

It is possible to follow with a desired error dynamic characteristics to be governed by an equation (62) in the control amount operation means 16 even with respect to an optional target yaw rate to be obtained by the target yaw rate track setting means with a map of vehicle speed and steering wheel angle or the like.

In accordance with the present embodiment, the TDC control can be adapted even to an optional target yaw rate which cannot be represented with by transfer function.

A tenth embodiment of the present invention is described hereinafter.

A road surface friction coefficient μ which is a friction coefficient between a tire and ground is changed by approximately five times between a dry road surface and a wet road surface, so that the transfer characteristics of a vehicle body are changed. When a target yaw rate tuned on a dry road surface is used on the wet road surface as is, the target yaw rate becomes too large so that a spinning operation may be caused. When a target yaw rate set on the wet road surface is used on the dry road surface, the yaw rate becomes small, which causes a problem that satisfactory responses cannot be obtained. The present embodiment is adapted to remove such defects.

Figure 15:
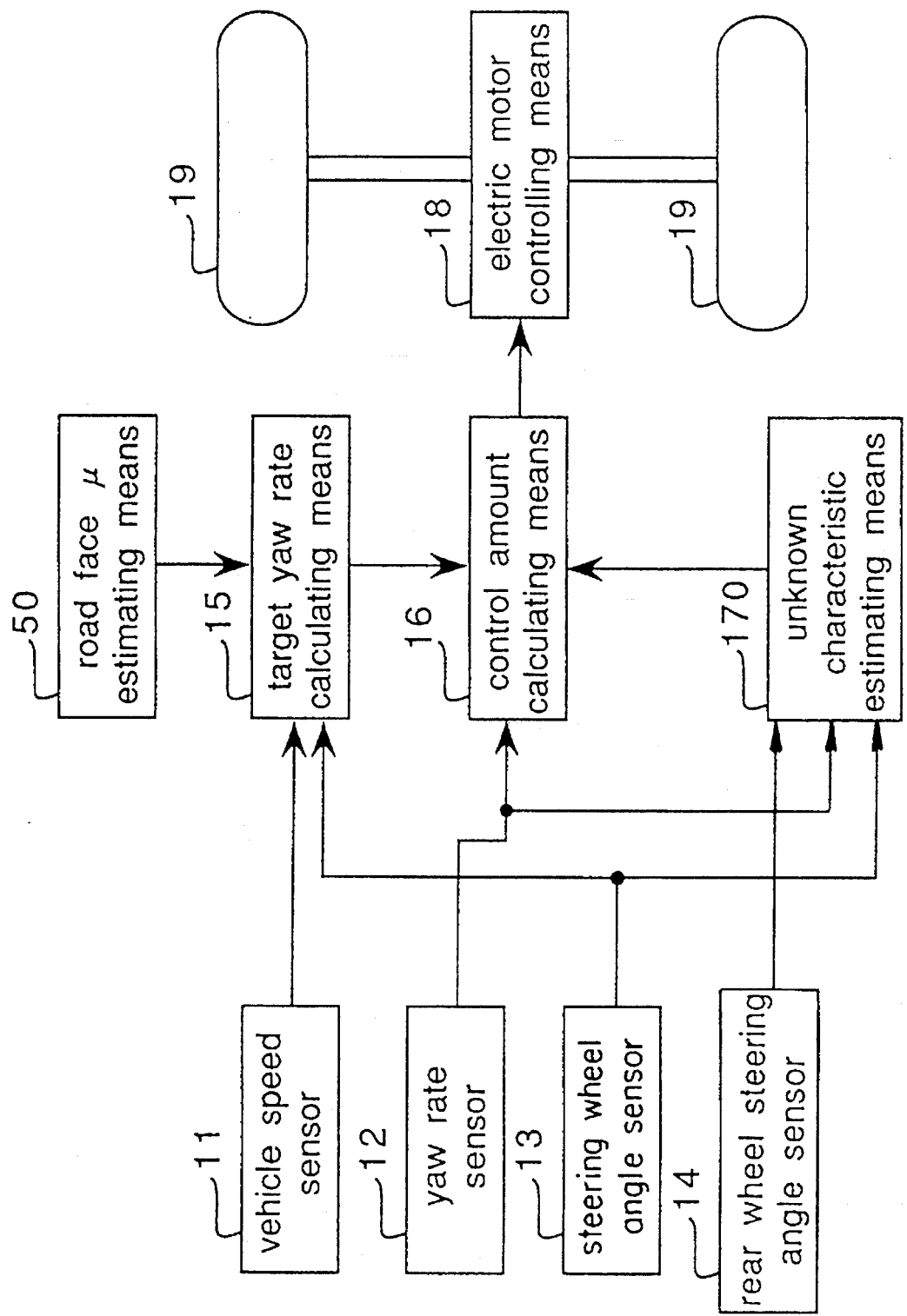
FIG. 15 is a view of a tenth embodiment of the present invention.

FIG. 15 shows a block diagram of the present embodiment. A stationary target yaw rate value f(μ') is calculated in accordance with a following equation by an estimated value μ' of the road surface friction coefficient μ.

$$Y_0=A*V*θf/(1+B*f(μ)) \quad (65)$$

wherein a function of an estimated value μ' of a road surface μ is f(μ'), a vehicle speed is V, a front wheel steering angle is θf, and A and B are constants. The function f(μ') is made, for example, a monotonic decreasing function. It becomes larger if the μ' is smaller, and becomes smaller if the μ' is larger. It can be calculated so that the stationary yaw rate value may become larger on a dry road surface (high μ road) and it may become smaller on a wet road surface (low μ road) so that a target yaw rate corresponding to the state of the road surface can be obtained.

In accordance with the present embodiment, it can be calculated that the stationary yaw rate value may become large on the dry road surface (high μ road), and may become small on the wet road surface (low μ road) using the estimation value of the road surface μ, so that the target yaw rate corresponding to the state of the road surface can be obtained.

An eleventh embodiment of the present invention is described hereinafter.

When a steering wheel steering angle is high, it goes out of a restriction region of a tire especially on a low μ road into a non-linear region so as to lower the steering safety. Therefore, it is necessary to lower the target yaw rate before the restriction of the tire is exceeded.

The present embodiment removes such defects.

A construction of the present embodiment is similar to that of the ninth embodiment.

A stationary target yaw rate value is calculated in accordance with the following equation by the estimation value μ' of the road surface μ.

$$Ym_0 = A*V*g(\theta f)/(1+B*f(\mu)) \quad (66)$$

where a function f of an estimated value μ' of a road μ is f (μ'), a vehicle speed is V, a function of a front wheel steering angle θf is g(θf), and A and B are constants.

A function g (θf) is given a monotonic increasing function in a map or the like when the front wheel steering angle θf is smaller than the θfd to be decided from the road surface μ and the vehicle speed V. When the front wheel steering angle θf becomes larger than the θfd, it is given in a monotonic decreasing function. Thus, it is prevented from entering the non-linear region which is beyond the tire restriction without increased setting of the target yaw rate.

In accordance with the present embodiment, a target yaw rate value is set smaller than the yaw rate which becomes a side slip angle β=0 in accordance with the estimated value μ' of road surface μ and the steering amount of the front wheel steering angle, so that it is prevented from entering the nonlinear region which is beyond the restriction of the tire.

A twelfth embodiment of the present invention is described hereinafter.

A road surface μ is changed by approximately five times between a dry road surface and a wet road surface, so that the transfer characteristics of a vehicle body are changed. When a control gain C on the dry road surface is used as it is on the wet road surface, a following property to the target yaw rate is deteriorated. An optimum control gain C is used on the WET road surface, which causes a defect that the stability is deteriorated. The present embodiment removes such a defect.

Figure 16:
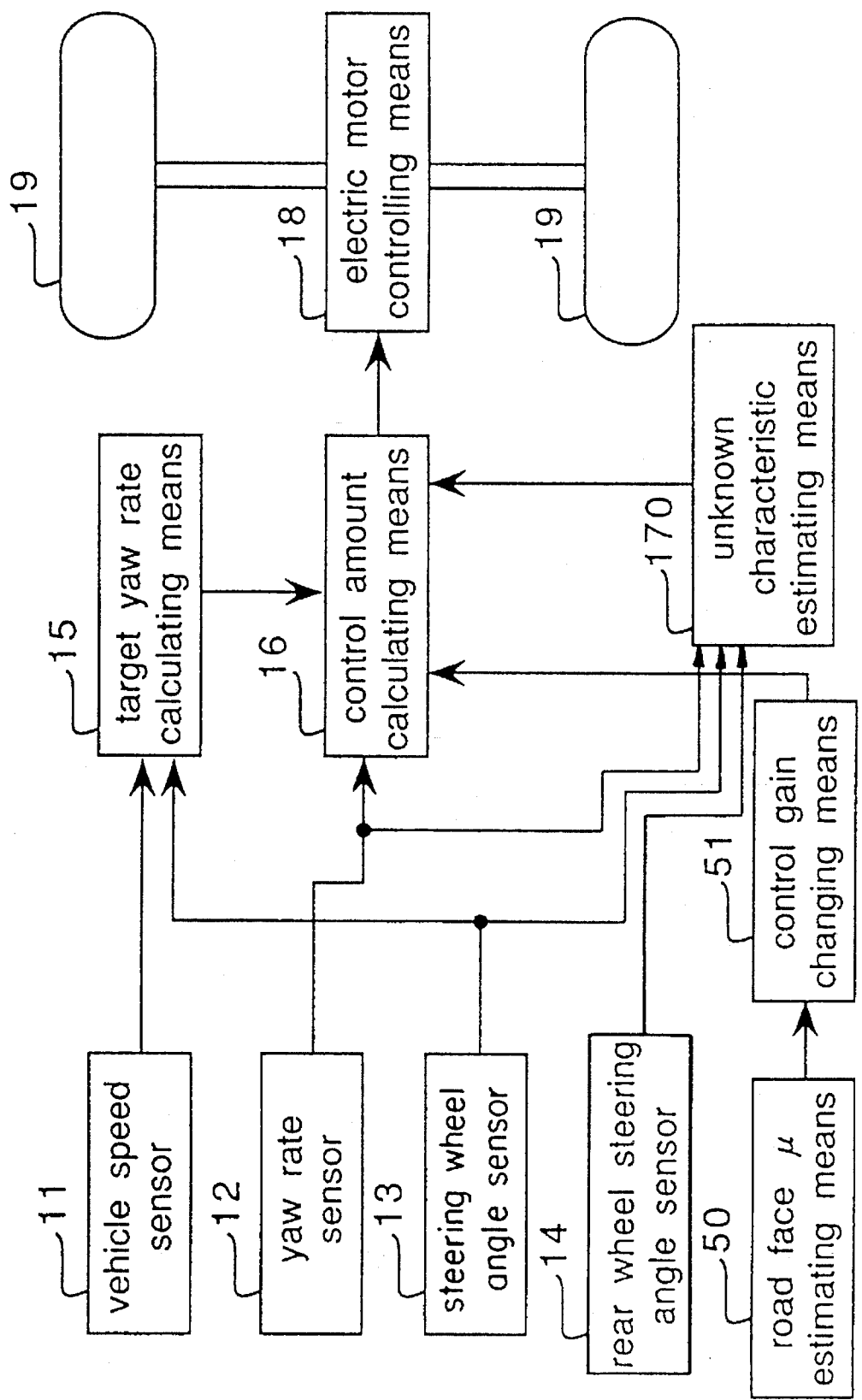
FIG. 16 is a view of a twelfth embodiment of the present invention.

FIG. 16 shows a block diagram of the present embodiment.

In a control gain changing means 51, a parameter c for calculating the control gain is given with a function C(μ'). A control gain is changed in accordance with the value of the estimated μ by the road surface μ estimating means 50. Namely, a rear wheel target steering angle given by the following equation is used.

$$\theta r(t) = \theta r(t-L) - \{e[\theta f(t) - \theta f(t-L)] + Ldm\theta f(t) + \quad (67)$$
$$pm1[\theta f(t) - \theta f(t-L)] - am[Y(t) - Y(t-L)] - LbmY(t)\}/C(\mu')$$

A function C (μ') is made, for example, a monotonic increasing function. When the μ' is smaller, it becomes smaller. When the μ' is larger, it becomes larger.

A control gain corresponding to the state of the road can be used. A control performance satisfactory in both safety and following property can be obtained on all of the road surfaces. In accordance with the present embodiment, a control performance satisfactory in both safety and following property can be obtained by changing the control gain C by the estimated value μ' of road surface μ.

As is clear from the foregoing description, according to a first embodiment of the present invention, better control results are obtained even with respect to vehicle speed variations, without preservation of a large amount of gain corresponding to the vehicle speed as a map, by estimating a term where vehicle dynamic characteristics are varied by a vehicle speed, which causes the effect that stable characteristics are shown especially in a high speed region.

According to a second embodiment, a control system capable of high speed response can be made with a simple control rule by regarding the handle steering angle inputs as external disturbances, and estimating a vehicle dynamic characteristic variation term by the handle steering angle input, which causes the effect that better characteristics are shown especially in the low vehicle speed region.

According to a third embodiment, a control input to a rear wheel can be calculated using a front wheel characteristic estimating means as an unknown characteristic estimating rule in a low vehicle speed region, and of a vehicle speed characteristic estimating means in a high vehicle speed region, which causes a stable response which is superior in control performance from the low speed region to the high speed region.

According to a fourth embodiment, a rear wheel steering angle can be steered in a reverse phase for a moment by giving a zero point to the yaw rate reference model, which enables a control system where a side slip angle can be reduced even at a transition time.

According to a fifth embodiment, a response property of a vehicle is improved, and a side slip angle at a transient time can be reduced by changing respective coefficients of the yaw rate reference model in accordance with the vehicle speed, which causes better control performance to be obtained in accordance with the vehicle speed.

According to a sixth embodiment, yaw rate gains and so on are changed equivalently by changing the reference model in accordance with the steering wheel steering angle speed, which causes optimum responses to be obtained even at a quick steering wheel steering time in collision avoidance and so on.

According to a seventh embodiment, an effect can be provided for realizing the control capable of precisely following the target yaw rate even if two step differential values of the yaw rate being received are greatly influenced by noise of the yaw rate sensor signals.

According to an eighth embodiment, a TDC control can be provided which can secure the high speed stability at the high speed range, and has a control rule for taking a serious view of small sharp turning at the low speed range.

According to a ninth embodiment, an effect can be provided for realizing various response property applicable to the TDC control by means of giving target yaw rate tracking by a map against an optional target yaw rate which can not be expressed by a transfer function.

According to a tenth embodiment, an effect can be provided for obtaining a target yaw rate responding to road conditions by means of calculating the normal yaw rate value on the employment of an estimated value of road plane μ, in such a manner that the normal yaw rate value is large on the dry road plane of high μ road, and is small on the wet road plane of low μ road.

According to a eleventh embodiment, an effect can be provided for preventing from entering into a non-liner region beyond the limit of tire by means of setting up a target yaw rate value smaller than the yaw rate having a side slip angle β equal to zero in response to the steering amount of front wheel steering angle and the estimated value of the road plane μ.

According to a twelfth embodiment, an effect can be provided for getting a control property satisfying the stability and follow ability by means of changing the control gain C on the employment of estimated value of road plane μ.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In an apparatus for controlling a rear wheel steering angle of a four-wheel steering vehicle which includes a vehicle speed sensor for detecting the speed of a vehicle, a yaw rate sensor for detecting a yaw rate, a steering wheel angle sensor for detecting a rotary angle of a steering wheel, a rear wheel steering angle sensor for detecting a rear wheel steering angle, and an electric motor controlling means for steering a rear wheel in accordance with a rear wheel steering angle instruction signal, the improvement comprising:

a target yaw rate calculating means for calculating a target yaw rate for a moving vehicle in accordance with a vehicle speed and a steering wheel angle;

a vehicle speed characteristic estimating means for estimating a vehicle dynamic characteristic variation term due to a vehicle speed change in accordance with known values of a yaw rate, steering wheel angle and rear E wheel steering angle a microtime before the estimation, without directly detecting a vehicle speed change;

a control amount calculating means having an input thereof connected to outputs of said estimating means and said target yaw rate calculating means and yaw rate sensor, for calculating a rear wheel steering angle instruction signal value fed to said electric motor controlling means based on the resultant value obtained by said vehicle speed characteristic estimating means in accordance with error dynamics defined by a deviation between the actual yaw rate detected by said yaw rate sensor and the target yaw rate calculated by said target yaw rate calculating means so that the deviation is minimized.

2. The apparatus as recited in claim 1, wherein said control amount calculating means calculates the rear wheel steering angle instruction signal value by which the actual yaw rate becomes the target yaw rate without changing a control gain in accordance with the vehicle speed change.

3. In an apparatus for controlling a rear wheel steering angle of a four-wheel steering vehicle which includes a vehicle speed sensor for detecting the speed of a vehicle, a yaw rate sensor for detecting a yaw rate, a steering wheel angle sensor for detecting a rotary angle of a steering wheel, a rear wheel steering angle sensor for detecting a rear wheel steering angle, and an electric motor controlling means for steering a rear wheel in accordance with a rear wheel steering angle instruction signal, the improvement comprising:

a target yaw rate calculating means for calculating a target yaw rate for a moving vehicle in accordance with a vehicle speed and a steering wheel angle;

a front wheel characteristic estimating means for estimating a vehicle dynamic characteristic variation term due to a vehicle speed change and operation of a steering wheel in accordance with known values of yaw rate and rear wheel steering angle a microtime before the estimation, without directly detecting a vehicle speed change and steering wheel variation;

a control amount calculating means, having an input thereof connected to outputs of said estimating means and said target yaw rate calculating means and yaw rate sensor, for calculating a rear wheel steering angle instruction signal value fed to said electric motor controlling means based on the resultant value obtained by said front wheel characteristic estimating means in accordance with error dynamics defined by a deviation between the actual yaw rate detected by said yaw rate sensor and the target yaw rate calculated by said target yaw rate calculating means so that the deviation is minimized.

4. The apparatus as recited in claim 3, wherein said control amount calculating means calculates the rear wheel steering angle instruction signal value by which the actual yaw rate becomes the target yaw rate, without changing a control gain in accordance with the vehicle speed change and steering wheel steering variation amount.

5. In an apparatus for controlling a rear wheel steering angle of a four-wheel steering vehicle which includes a vehicle speed sensor for detecting the speed of a vehicle, a yaw rate sensor for detecting a yaw rate, a steering wheel angle sensor for detecting rotary angle of a steering wheel, a rear wheel steering angle sensor for detecting a rear wheel steering angle, and an electric motor controlling means for steering a rear wheel in accordance with a rear wheel steering angle instruction signal, the improvement comprising:

a target yaw rate calculating means for calculating a target yaw rate for a moving vehicle in accordance with a vehicle speed and a steering wheel angle;

a vehicle speed characteristic estimating means for estimating a vehicle dynamic characteristic variation term due to a vehicle speed change in accordance with known values of a yaw rate, steering wheel angle and rear wheel steering angle a microtime before the estimation, without directly detecting a vehicle speed change;

a front wheel characteristic estimating means for estimating a vehicle dynamic characteristic variation term due to a vehicle speed change and operation of a steering wheel in accordance with known values of yaw rate and rear wheel steering angle a microtime before the estimation, without directly detecting a vehicle speed change and steering wheel variation;

an estimating rule changing means for selecting between said vehicle speed characteristic estimating means and said front wheel characteristic estimating means in accordance with a vehicle speed;

a control amount calculating means, having an input thereof connected to one output of said vehicle speed characteristic estimating means or said front wheel characteristic estimating means, said one output being selected by said estimating rule changing means, and also having inputs connected to said target yaw rate calculating means and said yaw rate sensors, for calculating a rear wheel steering angle instruction signal value fed to said electric motor controlling means based on the resultant estimation obtained by said estimating means selected by said estimation rule changing means in accordance with an error dynamics defined by a deviation between the actual yaw rate detected by said yaw rate sensor and the target yaw rate calculated by said target yaw rate calculating means so that the deviation is minimized.

6. The apparatus as recited in claim 1, wherein, in said target yaw rate calculating means, the target yaw rate is set equal to a stationary yaw rate value which is calculated in accordance with the vehicle speed and steering wheel angle so that the motion of the vehicle becomes stable in a stationary mode, with a response characteristic of a transfer function G(S) given in a frequency region and wherein the transfer function G(S) has at least one stable zero point to compensate for a phase delay at the time of initial steering.

7. The apparatus as recited in claim 3, wherein, in said target yaw rate calculating means, the target yaw rate is set equal to a stationary yaw rate value which is calculated in accordance with the vehicle speed and steering wheel angle so that the motion of the vehicle becomes stable in a stationary mode, with a response characteristic of a transfer function G(S) given in a frequency region and wherein the transfer function G(S) has at least one stable zero point to compensate for a phase delay at the time of initial steering.

8. The apparatus as recited in claim 5, wherein, in said target yaw rate calculating means, the target yaw rate is set equal to a stationary yaw rate value which is calculated in accordance with the vehicle speed and steering wheel angle so that the motion of the vehicle becomes stable in a stationary mode, with a response characteristic of a transfer function G(S) given in a frequency region and wherein the transfer function G(S) has at least one stable zero point to compensate for a phase delay at the time of initial steering.

9. The apparatus as recited in claim 1, wherein, in said target yaw rate calculating means, the target yaw rate is set equal to a stationary yaw rate value which is calculated in accordance with the vehicle speed and steering wheel angle so that the motion of the vehicle becomes stable in a stationary mode, with a response characteristic of a transfer function G(S) given in a frequency region and wherein said target yaw rate calculating means comprises a convergence characteristic changing means for providing each coefficient of the transfer function G(S) as a function of a state variable corresponding to a characteristic of the vehicle.

10. The apparatus as recited in claim 3, wherein, in said target yaw rate calculating means, the target yaw rate is set equal to a stationary yaw rate value which is calculated in accordance with the vehicle speed and steering wheel angle so that the motion of the vehicle becomes stable in a stationary mode, with a response characteristic of a transfer function G(S) given in a frequency region and wherein said target yaw rate calculating means comprises a convergence characteristic changing means for providing each coefficient of the transfer function G(S) as a function of a state variable corresponding to a characteristic of the vehicle.

11. The apparatus as recited in claim 5, wherein, in said target yaw rate calculating means, the target yaw rate is set equal to a stationary yaw rate value which is calculated in accordance with the vehicle speed and steering wheel angle so that the motion of the vehicle becomes stable in a stationary mode, with a response characteristic of a transfer function G(S) given in a frequency region and wherein said target yaw rate calculating means comprises a convergence characteristic changing means for providing each coefficient of the transfer function G(S) as a function of a state variable corresponding to a characteristic of the vehicle.

12. In an apparatus for controlling a rear wheel steering angle of a four-wheel steering vehicle which includes a vehicle speed sensor for detecting a speed of a vehicle, a yaw rate sensor for detecting a yaw rate, a steering wheel angle sensor for detecting a rotary angle of a steering wheel, a rear wheel steering angle sensor for detecting a rear wheel steering angle, and an electric motor controlling means for steering a rear wheel in accordance with a rear wheel steering angle instruction signal, the improvement comprising:

a target yaw rate calculating means for calculating a target yaw rate for a moving vehicle in accordance with a vehicle speed and a steering wheel angle;

a steering wheel steering angle speed sensor for detecting a steering wheel steering angle speed;

a target yaw rate rule changing means for generating a signal for changing over a target yaw rate calculation formula of said target yaw rate calculating means in accordance with the value of the steering wheel steering angle speed detected by said steering wheel steering angle speed sensor; and a control amount calculating means, having an input thereof connected to outputs of said target yaw rate calculating means whose target yaw rate calculation formula is changed by said target yaw rate rule changing means and said yaw rate sensor and rear wheel steering angle sensor, for calculating a rear wheel steering angle instruction signal value which is fed to said electric motor controlling means by which an actual yaw rate becomes a target yaw rate corresponding to the steering wheel steering angle speed, based on the signal generated by said target yaw rate rule changing means.

13. The apparatus recited in claim 12, wherein, said target yaw rate rule changing means generates an instruction signal using a reference model of the target yaw rate which converges with a response characteristic of a transfer function G(S) including a zero point having a negative value in a stationary yaw rate corresponding to the vehicle speed and steering wheel steering angle when the steering wheel steering angle speed detected by said steering wheel steering angle speed sensor is larger than a predetermined value;

and wherein said target yaw rate rule changing means alternatively generates an instruction signal using a reference model of the target yaw rate which converges with a response characteristic of a transfer function F(S) including no zero point in a stationary yaw rate corresponding to the vehicle speed and steering wheel steering angle when the steering wheel steering angle speed detected by said steering wheel steering angle speed sensor is smaller than a predetermined value.

14. The apparatus as recited in claim 12, wherein said target yaw rate rule changing means generates a signal for changing the value at the zero point of the reference model of the target yaw rate which converges with a response characteristic of the transfer function G(S) including a zero point in accordance with the value of the steering wheel steering angle speed detected by said steering wheel steering angle speed sensor.

15. The apparatus as recited in claim 12, wherein said target yaw rate rule changing means generates a signal for changing the value at the zero point of the reference model of the target yaw rate which converges with a response characteristic of the transfer function G(S) including a zero point in accordance with the value of the steering wheel steering angle speed detected by said steering wheel steering angle speed sensor and the vehicle speed value detected by said vehicle speed sensor.

16. In an apparatus for controlling a rear wheel steering angle of a four-wheel steering vehicle which includes a vehicle speed sensor for detecting the speed of a vehicle, a yaw rate sensor for detecting a yaw rate, a steering wheel angle sensor for detecting a rotary angle of a steering wheel, a rear wheel steering angle sensor for detecting a rear wheel steering angle, and an electric motor controlling means for steering a rear wheel in accordance with a rear wheel steering angle instruction signal, the improvement comprising:

a target yaw rate calculating means for calculating a target yaw rate for a moving vehicle in accordance with a vehicle speed and a steering wheel angle;

an unknown characteristic estimating means for estimating an unknown term of a vehicle dynamic characteristic variation due to an external disturbance and a modelling error in accordance with known terms which are output values of the vehicle sped, yaw rate, and steering wheel angle and rear wheel steering angle sensors at a time which is a microtime before the estimation;

a difference control amount calculating means for calculating a difference control signal for eliminating the difference error while cancelling the influence of an unmeasurable external disturbance and modelling error based on a resultant estimation value obtained by said unknown characteristic estimating means in accordance with a difference error dynamic which is given by a difference between an error dynamics at a time k defined by an error between the actual yaw rate detected by said yaw rate sensor and the target yaw rate calculated by said target yaw rate calculating means and an error dynamics at a time (k–1) which is a time which is one control period before the time k; and a control amount calculating means for calculating a rear wheel steering angle instruction signal value, by integrating or summing the output signal of said difference control amount calculating means input thereto, said rear wheel steering angle instruction signal being fed to said electric motor control means so that the actual yaw rate becomes equal to a target yaw rate.

17. In an apparatus for controlling a rear wheel steering angle of a four-wheel steering vehicle which includes a vehicle speed sensor for detecting a speed of a vehicle, a yaw rate sensor for detecting a yaw rate, a steering wheel angle sensor for detecting a rotary angle of a steering wheel, a rear wheel steering angle sensor for detecting a rear wheel steering angle, and an electric motor controlling means for steering a rear wheel in accordance with a rear wheel steering angle instruction signal, the improvement comprising:

a target yaw rate calculating means for calculating s target yaw rate for a moving vehicle in accordance with a vehicle speed and a steering wheel angle;

an unknown characteristic estimating means for estimating an unknown term of a vehicle dynamic characteristic variation due to an external disturbance and a modelling error in accordance with known terms which are output values of the yaw rate and steering wheel angle and rear wheel steering angle sensor at a time which is a microtime before the estimation;

a low speed control amount calculating means for calculating a rear wheel steering angle instruction signal value based on the steering wheel steering angle and vehicle speed when in a low speed mode region where the actual vehicle speed is below a predetermined value;

a middle and high speed control amount calculating means having an input thereof connected to outputs of said unknown characteristic estimating means and yaw rate sensor and target yaw rate calculating means for calculating a target rear wheel steering angle instruction signal value so that the actual yaw rate tracks the target yaw rate when in a middle and high speed mode region where the actual vehicle speed is larger than a predetermined value; and a control amount changing-over means for switching between a rear wheel steering angle instruction signal value which is fed to said electric motor controlling means and which is calculated by said low speed control amount calculating means or a rear wheel steering angle instruction signal value which is fed to said electric motor controlling means and which is calculated by said middle and high speed control amount calculating means, where switching is in accordance with the vehicle speed.

18. In an apparatus for controlling a rear wheel steering angle of a four-wheel steering vehicle which includes a vehicle speed sensor for detecting a speed of a vehicle, a yaw rate sensor for detecting a yaw rate, a steering wheel angle sensor for detecting a rotary angle of a steering wheel, a rear wheel steering angle sensor for detecting a rear wheel steering angle, and an electric motor controlling means for steering a rear wheel in accordance with a rear wheel steering angle instruction signal, the improvement comprising:

a target yaw rate locus setting means for setting, as a time function a locus of a target yaw rate which converges to a stationary yaw rate corresponding to a vehicle speed and steering wheel angle;

an unknown characteristic estimating means for estimating an unknown term of a vehicle dynamic characteristic variation due to an external disturbance and a modelling error in accordance with known terms which are output values of the yaw rate and steering wheel angle and rear wheel steering angle sensors at a time which is a microtime before the estimation; and a control amount calculating means having an input thereof connected to outputs of said unknown characteristic estimating means and yaw rate sensor and target yaw rate locus setting means for calculating a rear wheel steering angle instruction signal value to be fed to said electric motor control means based on the resultant estimation value obtained by said unknown characteristic estimating means so as to reduce the difference error while cancelling the influence of an unmeasurable external disturbance and a modelling error in an error dynamics defined by an error difference between the actual yaw rate detected by said yaw rate sensor and the target yaw rate given as a locus of the time function.

19. The apparatus as recited in claim 1 wherein said target yaw rate calculating means comprises a road surface $\mu$ estimating mean for estimating a road surface $\mu$ and wherein the target yaw rate is set equal to the stationary yaw rate calculated in accordance with at least the vehicle speed, steering wheel angle, road surface $\mu$ with a response characteristic of a transfer function G(S) given in a frequency region so that the motion of the vehicle becomes stable in the stationary mode.

20. The apparatus as recited in claim 3, wherein said target yaw rate calculating means comprises a road surface $\mu$ estimating means for estimating a road surface $\mu$ and wherein the target yaw rate is set equal to the stationary yaw rate calculated in accordance with at least the vehicle speed, steering wheel angle, road surface $\mu$ with a response characteristic of a transfer function G(S) given in a frequency region so that the motion of the vehicle becomes stable in the stationary mode.

21. The apparatus as recited in claim 5, wherein aid target yaw rate calculating means comprises a road surface µ estimating means for estimating a road surface µ and wherein the target yaw rate is set equal to the stationary yaw rate calculated in accordance with at least the vehicle speed, steering wheel angle, road surface µ with a response characteristic of a transfer function G(S) given in a frequency region so that the motion of the vehicle becomes stable in the stationary mode.

22. The apparatus as recited in claim 16, wherein said target yaw rate calculating means comprise a road surface µ estimating means for extimating a road surface µ and wherein the target yaw rate is set equal to the stationary yaw rate calculated in accordance with the vehicle speed, steering wheel angle, road surface µ with a response characteristic of a transfer function G(S) given in a frequency region so that the motion of the vehicle becomes stable in the stationary mode.

23. The apparatus as recited in claim 17, wherein said target yaw rate calculating means comprises a road surface µ estimating means for estimating a road surface µ and wherein the target yaw rate is set equal to the stationary yaw rate calculated in accordance with at least the vehicle speed, steering wheel angle, road surface µ with a response characteristic of a transfer function G(S) given in a frequency region so that the motion of the vehicle becomes stable in the stationary mode.

24. The apparatus as recited in claim 18, wherein said target yaw rate calculating means comprises a road surface µ estimating means for estimating a road surface µ and wherein the target yaw rate is set equal to the stationary yaw rate calculated in accordance with at least the vehicle speed, steering wheel angle, road surface µ with the target yaw rate locus given as a time function by said target yaw rate setting means.

25. The apparatus as recited in any one of claims 19–24, wherein, in said target yaw rate calculating means, a stationary yaw rate value is given by a formula $$YO = A*V* \theta f/(1+B*f(\mu))$$

where YO denotes a stationary yaw rate value, $f(\mu)$ a function of a road surface µ, V a vehicle speed, $\theta f$ a front wheel steering angle, and A and B constants.

26. The apparatus as recited in any one of claims 19–24, wherein, in said target yaw rate calculating means, a stationary yaw rate value is given by a formula $$YO = A*V*g(\theta f)/(1+B*f(\mu))$$

where YO denotes a stationary yaw rate value, $f(\mu)$ a function of a road surface µ, V a vehicle speed, $g(\theta f)$ a function of a front wheel steering angle $\theta f$, and A and B constants.

27. The apparatus as recited in claim 1, wherein, in said control amount calculating means of a target yaw rate tracking type, the target rear wheel steering angle is given by a formula $$\theta RT = F(h(\theta f), h(\theta r), h(Y))/C$$

where $\theta f$ denotes a front wheel steering angle, $\theta r$ a rear wheel steering angle, $F(h(\theta f), h(\theta r), h(Y))$ a function of a yaw rate Y and $\theta RT$ a target rear wheel steering angle, and where $h(X)$ is given by a formula $$h(X) = h0*X + h1*dX/dt + h2*d^2X/dt^2 + \ldots hk*d^kX/dt^k$$

and C is given by a function $G(\mu)$ in connection with the road surface µ in said control gain changing means.

28. The apparatus as recited in claim 3, wherein, in said control amount calculating means of a target yaw rate tracking type, the target rear wheel steering angle is given by a formula $$\theta RT = F(h(\theta f), h(\theta r), h(Y))/C$$

where $\theta f$ denotes a front wheel steering angle, $\theta r$ a rear wheel steering angle, $F(h(\theta f), h(\theta r), h(Y))$ a function of a yaw rate Y and $\theta RT$ a target rear wheel steering angle, and where $h(X)$ is given by a formula $$h(X) = h0*X + h1*dX/dt + h2*d^2X/dt^2 + \ldots hk*d^kX/dt^k$$

and C is given by a function $G(\mu)$ in connection with the road surface µ in said control gain changing means.

29. The apparatus as recited in claim 5, wherein, in said control amount calculating means of a target yaw rate tracking type, the target rear wheel steering angle is given by a formula $$\theta RT = F(h(\theta f), h(\theta r), h(Y))/C$$

where $\theta f$ denotes a front wheel steering angle, $\theta r$ a rear wheel steering angle, $F(h(\theta f), h(\theta r), h(Y))$ a function of a yaw rate Y and $\theta RT$ a target rear wheel steering angle, and where $h(X)$ is given by a formula $$h(X) = h0*X + h1*dX/dt + h2*d^2X/dt^2 + \ldots hk*d^kX/dt^k$$

and C is given by a function $G(\mu)$ in connection with the road surface µ in said control gain changing means.

30. The apparatus as recited in claim 16, wherein, in said control amount calculating means of a target yaw rate tracking type, the target rear wheel steering angle is given by a formula $$\theta RT = F(h(\theta f), h(\theta r), h(Y))/C$$

where $\theta f$ denotes a front wheel steering angle, $\theta r$ a rear wheel steering angle, $F(h(\theta f), h(\theta r), h(Y))$ a function of a yaw rate Y and $\theta RT$ a target rear wheel steering angle, and where $h(X)$ is given by a formula $$h(X) = h0*X + h1*dX/dt + h2*d^2X/dt^2 + \ldots hk*d^kX/dt^k$$

and C is given by a function $G(\mu)$ in connection with the road surface µ in said control gain changing means.

31. The apparatus as recited in claim 17, wherein, in said control amount calculating means of a target yaw rate tracking type, the target rear wheel steering angle is given by a formula $$\theta RT = F(h(\theta f), h(\theta r), h(Y))/C$$

where $\theta f$ denotes a front wheel steering angle, $\theta r$ a rear wheel steering angle, $F(h(\theta f), h(\theta r), h(Y))$ a function of a yaw rate Y and $\theta RT$ a target rear wheel steering angle, and where $h(X)$ is given by a formula $$h(X) = h0*X + h1*dX/dt + h2*d^2X/dt^2 + \ldots hk*d^kX/dt^k$$

and C is given by a function $G(\mu)$ in connection with the road surface µ in said control gain changing means.

32. The apparatus as recited in claim 18, wherein, in said control amount calculating means of a target yaw rate tracking type, the target rear wheel steering angle is given by a formula $$\theta RT = F(h(\theta f), h(\theta r), h(Y))/C$$

where θf denotes a front wheel steering angle, θr a rear wheel steering angle, F(h(θf), h(θr), h(Y)) a function of a yaw rate Y and θ RT a target rear wheel steering angle, and where h(X) is given by a formula $$h(X) = h0*X + h1*dX/dt + h2*d^2X/dt^2 + \ldots hk*d^kX/dt^k$$

and C is given by a function G(μ) in connection with the road surface μ in said control gain changing means.

* * * * *